United States Patent
Castellani et al.

(10) Patent No.: US 11,390,118 B2
(45) Date of Patent: Jul. 19, 2022

(54) TYRE FOR VEHICLE WHEELS COMPRISING A COMPOSITE REINFORCING FILLER

(71) Applicant: Pirelli Tyre S.p.A., Milan (IT)

(72) Inventors: Luca Castellani, Milan (IT); Luca Zoia, Milan (IT); Syed Danish Ali, Milan (IT); Marco Orlandi, Milan (IT); Thomas Hanel, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 303 days.

(21) Appl. No.: 16/645,085

(22) PCT Filed: Sep. 12, 2018

(86) PCT No.: PCT/IB2018/056954
§ 371 (c)(1),
(2) Date: Mar. 6, 2020

(87) PCT Pub. No.: WO2019/053602
PCT Pub. Date: Mar. 21, 2019

(65) Prior Publication Data
US 2020/0282770 A1    Sep. 10, 2020

(30) Foreign Application Priority Data
Sep. 13, 2017 (IT) .................. 102017000102274

(51) Int. Cl.
*B60C 1/00* (2006.01)
*C08K 3/36* (2006.01)
(Continued)

(52) U.S. Cl.
CPC .............. *B60C 1/0016* (2013.01); *B60C 1/00* (2013.01); *B60C 1/0025* (2013.01);
(Continued)

(58) Field of Classification Search
CPC ..... C08B 15/05; B60C 1/0016; B60C 1/0025; B60C 1/0041; B60C 1/00;
(Continued)

(56) References Cited

U.S. PATENT DOCUMENTS

2012/0232192 A1   9/2012   Tochika
2015/0225552 A1   8/2015   Akai et al.
2016/0122515 A1   5/2016   Karampelas

FOREIGN PATENT DOCUMENTS

CN   102491343 A   6/2012
CN   103627055 A   3/2014
(Continued)

OTHER PUBLICATIONS

International Search Report form the European Patent Office in corresponding International Application No. PCT/IB2018/056954 dated Jan. 2, 2019.
(Continued)

*Primary Examiner* — Angela C Scott
(74) *Attorney, Agent, or Firm* — Finnegan, Henderson, Farabow, Garrett & Dunner, L.L.P.

(57) ABSTRACT

The invention relates to a tyre (100) for vehicle wheels comprising at least one structural element comprising a vulcanized elastomeric material obtained by vulcanizing a vulcanizable elastomeric composition comprising at least one vulcanizable diene elastomeric polymer and at least one composite reinforcing filler, a process for producing a tyre (100) comprising the composite reinforcing filler, a masterbatch comprising the composite reinforcing filler and a process for producing the same, as well as a process for producing the composite reinforcing filler.

30 Claims, 2 Drawing Sheets

(51) Int. Cl.
  *C08K 5/00* (2006.01)
  *C08K 9/02* (2006.01)
  *C08K 9/10* (2006.01)
  *C08L 1/02* (2006.01)
  *C08L 7/00* (2006.01)
  *C08L 9/00* (2006.01)
  *C08B 15/05* (2006.01)
  *C08L 21/00* (2006.01)

(52) U.S. Cl.
  CPC ............ *B60C 1/0041* (2013.01); *C08B 15/05* (2013.01); *C08K 3/36* (2013.01); *C08K 5/0025* (2013.01); *C08K 9/02* (2013.01); *C08K 9/10* (2013.01); *C08L 1/02* (2013.01); *C08L 7/00* (2013.01); *C08L 9/00* (2013.01); *C08L 21/00* (2013.01); *B60C 2001/005* (2013.01); *B60C 2001/0033* (2013.01); *B60C 2001/0066* (2013.01); *C08K 2201/003* (2013.01); *C08K 2201/004* (2013.01); *C08K 2201/006* (2013.01); *C08K 2201/011* (2013.01); *C08K 2201/013* (2013.01); *C08L 2310/00* (2013.01)

(58) Field of Classification Search
  CPC ...... B60C 2001/005; B60C 2001/0066; B60C 2001/0033; C08L 1/02; C08L 21/00; C08L 9/00; C08L 7/00; C08L 2310/00; C08K 9/10; C08K 9/02; C08K 3/36; C08K 5/0025; C08K 2201/004; C08K 2201/013; C08K 2201/011; C08K 2201/003; C08K 2201/006
  See application file for complete search history.

(56) References Cited

FOREIGN PATENT DOCUMENTS

| | | |
|---|---|---|
| CN | 104356434 A | 2/2015 |
| CN | 104987546 A | 10/2015 |
| CN | 105602025 A | 5/2016 |
| CN | 105670393 A | 6/2016 |
| CN | 106519352 A | 3/2017 |
| CN | 107129600 A | 9/2017 |
| EP | 3 681 945 B1 | 3/2022 |
| WO | WO 2017/004415 A1 | 1/2017 |

OTHER PUBLICATIONS

Written Opinion of the International Searching Authority from the European Patent Office in corresponding International Application No. PCT/IB2018/056954 dated Jan. 2, 2019.

Notification of the First Office Action dated Dec. 28, 2021, from China National Intellectual Property Administration, in counterpart Chinese Application No. 201880059438.3.

Office Action dated Apr. 6, 2022, from the Mexican Patent Office, in counterpart Mexican Application No. MX/a/2020/002486.

TYRE FOR VEHICLE WHEELS COMPRISING A COMPOSITE REINFORCING FILLER

This application is a national stage entry application under 35 U.S.C. § 371 based on International Application No. PCT/IB2018/056954, filed Sep. 12, 2018, and claims priority to Italian Patent Application No. 102017000102274, filed Sep. 13, 2017; the contents of each application is incorporated herein by reference.

FIELD OF THE INVENTION

The present invention relates to new tyres for vehicle wheels, comprising a reinforcing filler from a renewable composite source, characterized by good mechanical and rolling resistance properties, a greater efficiency and a lower weight.

In particular, the present invention relates to a tyre for vehicle wheels comprising at least one structural element comprising a vulcanized elastomeric material obtained by vulcanizing a vulcanizable elastomeric composition comprising at least one vulcanizable diene elastomeric polymer and at least one composite reinforcing filler. The present invention further relates to a process for producing a tyre comprising the composite reinforcing filler, a masterbatch comprising the composite reinforcing filler and a process for producing the same, as well as a process for producing the composite reinforcing filler.

STATE OF THE ART

In the rubber industry, and more specifically in the tyre industry, it is known to add reinforcing fillers to elastomeric compositions in order to improve the mechanical properties and the abrasion resistance of the elastomeric materials obtained from them by vulcanization.

Thanks to its high reinforcing power, carbon black is the most commonly used filler. However, the carbon black imparts to the manufactured products a remarkable hysteresis, i.e. it increases the heat dissipated in dynamic conditions. In the tyres, this translates into the undesired increase in rolling resistance, and overall into a greater fuel consumption and production of more polluting emissions.

Currently, most vehicle manufacturers increasingly ask their suppliers to develop tyres having a low rolling resistance to reduce fuel consumption.

An improvement in this sense has been achieved by the use of so-called "white" reinforcing fillers, such as gypsum, talc, kaolin, bentonite, titanium dioxide, and particularly silica, fillers that can partially or completely replace carbon black in the elastomeric materials and give them less hysteresis while maintaining a sufficient reinforcing action.

However, the use of silica as reinforcing filler for elastomeric compositions has various limitations.

One of the most apparent drawbacks is the poor workability of non-cross-linked compositions containing silica, mainly due to their excessive viscosity.

Furthermore, silica particles have a strong tendency to coalesce and to form agglomerates when finely dispersed in the elastomeric polymeric base. Therefore, in order to obtain a good silica dispersion in the elastomeric polymeric base an intense and prolonged thermo-mechanical processing of the composition is necessary.

In addition to this, the silica-based reinforcing fillers have substantially higher density values (about 2 $g/cm^3$) with respect to the average density of common elastomers (about 1 $g/cm^3$) and therefore their use leads to an increase of the densities of the compositions in which they are used. The use of high-density elastomeric compositions leads to heavier tyres being made and this can have a negative impact on their efficiency.

In recent times, in order to partially or totally replace silica-based fillers it has been proposed to use reinforcing fillers originating from a renewable source based on cellulose fibers, in particular nanocrystalline cellulose fibers, also surface modified.

For example, S. H. Xu et al, eXPRESS Polymer Letters Vol. 6, No. 1 (2012) 14-25 describes a nanocrystalline cellulose that has been modified with 3-aminopropyl triethoxysilane (KH550). The modified crystalline cellulose was tested as partial substitute of silica in natural rubber composites via coagulation. Nanocomposites of natural rubber/modified crystalline cellulose/silica and natural rubber/crystalline cellulose/silica were prepared.

SUMMARY OF THE INVENTION

The Applicant has observed that the solutions of the state of the art that propose to use reinforcing fillers based on nanocrystalline cellulose fibers in elastomeric compositions can have some technological and functional limitations.

In particular, the Applicant has observed that the high hydrophilicity of nanocrystalline cellulose fibers makes problematic the dispersion thereof in an elastomeric matrix even using coupling agents such as for example silane-based coupling agents containing sulfur (such as bis(3-ethoxysilylpropyl tetrasulfide or TESPT). Therefore, in order to obtain a homogeneous dispersion of cellulose fibers in the elastomeric polymeric base, an intense and prolonged thermal-mechanical processing of the composition itself appears in any case necessary, which can degrade the performance of the elastomer.

The Applicant has further observed that the fillers based on nanocrystalline cellulose fibers can display a reinforcing effect which is, as a whole, lower than that of silica-based reinforcing fillers, even if subjected to functionalization reactions or even if assisted by coupling agents.

The Applicant has therefore set itself the problem of identifying a new type of reinforcing fillers for elastomeric compositions capable of reducing and/or overcoming the aforementioned drawbacks.

More particularly, the Applicant has set itself the problem of identifying a reinforcing filler that derives from raw materials of renewable origin, which is simple to make and use and that is capable of imparting to a tyre for vehicle wheels greater efficiency along with good mechanical, rolling resistance properties through a reduction of the tyre weight and low production costs.

According to the present invention, the Applicant has surprisingly found that these desired characteristics can be achieved by using, in a vulcanizable elastomeric composition for producing a structural element of a tyre for vehicle wheels, a composite reinforcing filler that comprises a core comprising nanocrystalline cellulose and an at least partial coating comprising silica, and by making said composite reinforcing filler by means of a new process that allows the creation of an at least partial coating comprising silica around a core comprising nanocrystalline cellulose.

Therefore, the present invention relates, in a first aspect thereof, to a tyre for vehicle wheels comprising at least one structural element comprising a vulcanized elastomeric material obtained by vulcanizing a vulcanizable elastomeric composition comprising:

(a) at least one vulcanizable diene elastomeric polymer;
(b) at least one composite reinforcing filler that comprises a core comprising nanocrystalline cellulose and an at least partial coating comprising silica.

The Applicant has found that thanks to the use of a composite reinforcing filler configured in this way it is possible to obtain a tyre that, with respect to the prior art, shows a series of very advantageous technical effects, including:

- good mechanical and rolling resistance properties, obtained by means of the reinforcing effect of the composite reinforcing filler. In particular, the Applicant has found that the composite reinforcing filler according to the present invention imparts unexpected properties to the tyre elastomeric materials in which it is used, reinforcing said materials in an overall better manner with respect to conventional silica-based fillers. This allows to use lower amounts of reinforcing filler to achieve properties analogous to those that can be obtained using silica-based fillers;
- a lower weight with respect to analogous tyres obtained using a silica-based reinforcing filler. In particular, the Applicant has found that thanks to the lower density of the composite reinforcing filler according to the present invention with respect to silica, the composite reinforcing filler allows to manufacture elastomeric materials having a lower density and thus to obtain lighter tyres, imparting to the latter a greater efficiency;
- a greater reinforcing effect of the composite reinforcing filler according to the present invention, which is greater than that achieved by silica-based fillers, which reinforcing effect allows to use more limited amounts of reinforcing fillers to achieve good mechanical and rolling resistance properties;
- the compatibility of the manufacturing process of the tyre according to the present invention with the prior art production processes of tyre production. The composite reinforcing filler according to the present invention, in fact, proved easier to disperse in an elastomeric composition with respect to fillers of nanocrystalline cellulose fibers so that its incorporation in the elastomeric material to be reinforced can advantageously be implemented without requiring an excessively long and intense thermal-mechanical processing and/or the adoption of complicated additional processing steps;
- a greater productivity of the tyre production process thanks to the higher vulcanization kinetics of the compositions that comprise the composite reinforcing filler according to the present invention with respect to compositions that comprise silica-based fillers. Higher vulcanization kinetics, in fact, are advantageous for obtaining a high productivity in the processes for manufacturing vulcanized elastomeric materials, thereby reducing the production costs of the tyre;
- the possibility of making a tyre having good mechanical and rolling resistance properties comprising a reinforcing filler originating from a renewable source, which meets the requirement of using raw materials that do not compromise the natural resources for future generations.

Due to the technical effects outlined above, the tyre according to the present invention is therefore endowed with good mechanical and rolling resistance properties, a lower weight, and greater efficiency together with lower production costs.

Within the framework of the present description and of the subsequent claims, the expression "nanocrystalline cellulose" is used to indicate a highly crystalline cellulose in fiber form with a needle-like morphology having dimensions typically ranging from 5 to 30 nm in diameter and 100-1000 nm in length. Nanocrystalline cellulose is typically obtained by means of acid hydrolysis treatments of cellulose fibers known by those skilled in the art, which treatments aim to remove the amorphous fraction of the cellulose, leaving on the other hand the crystalline fraction substantially unchanged, which therefore, at the end of said treatments, is present in greater amounts with respect to the starting cellulose.

Preferably, the crystallinity degree of the nanocrystalline cellulose is greater than 40%, more preferably greater than 50%, even more preferably greater than 60%, and still more preferably ranging from 70% to 95%.

For the purposes of the invention, the crystallinity degree of the nanocrystalline cellulose and of the composite reinforcing filler (b) can be advantageously measured by means of X-ray diffractometry using for example an XPert Pro Panalytical Diffractometer, set at a radiation Cu Kα at 40 kV and 40 mA and by calculating the crystallinity by means of the equation $$Cs = \frac{I_{002} - I_{am}}{I_{002}} \times 100$$

where:
Cs is the crystallinity degree (%),
$I_{002}$ is the intensity of the diffraction peak of the plane (002), and
$I_{am}$ is the minimum intensity close to the diffraction angle at 18.58 degrees.

In view of the morphological characteristics indicated above of the nanocrystalline cellulose that forms the core of the composite reinforcing filler according to the present invention, the latter is therefore a substantially anisotropic composite reinforcing filler.

Within the framework of the present description and of the subsequent claims, the expression "elastomeric polymer" or "elastomer" is used to indicate a natural or synthetic polymer that, after vulcanization, at room temperature can be drawn repeatedly to at least double its original length and that after removal of the tensile load immediately returns and with force to its approximately original length (definition according to ASTM, committee E8, Philadelphia 1976).

Within the framework of the present description and of the subsequent claims, the expression "diene polymer" is used to indicate a polymer or copolymer that derives from the polymerization of one or more different monomers, at least one of which is a conjugated diene (conjugated diolefin).

In a second aspect thereof, the present invention relates to a process for producing a tyre for vehicle wheels, wherein the process comprises:
providing a vulcanizable elastomeric composition comprising:
(a) at least one vulcanizable diene elastomeric polymer;
(b) at least one composite reinforcing filler that comprises a core comprising nanocrystalline cellulose and an at least partial coating comprising silica;
providing a structural tyre element comprising the vulcanizable elastomeric composition;
assembling the structural tyre element in a green tyre;
vulcanizing the green tyre.

Thanks to the dispersability and workability properties of the composite reinforcing filler, the production process according to the invention of the tyre which incorporates the filler may be easily implemented on conventional production lines thereby contributing to keep down the production costs, as stated above.

Within the framework of the present description and of the subsequent claims, the term "green" is used to indicate a material, a composition, a component or a tyre that is not yet vulcanized.

In a third aspect thereof, the present invention relates to a masterbatch comprising:
(a) at least one vulcanizable diene elastomeric polymer;
(b) at least one composite reinforcing filler that comprises a core comprising nanocrystalline cellulose and an at least partial coating comprising silica.

Thanks to the dispersability and workability properties of the composite reinforcing filler, the latter can be advantageously used to make a masterbatch, which facilitates the storage, transportation and dosing during use as well as further facilitates the dispersion of the filler within the elastomeric composition therefore contributing to improve the reinforcing effect thereof.

Within the framework of the present description and of the subsequent claims, the term "masterbatch", is used to indicate a polymeric compound in which an additive, in the present case the composite reinforcing filler, is dispersed and diluted within a polymeric matrix in order to be more easily dosed in successive processing steps.

In a fourth aspect thereof, the present invention relates to a process for producing a masterbatch comprising:
(a) at least one vulcanizable diene elastomeric polymer;
(b) at least one composite reinforcing filler that comprises a core comprising nanocrystalline cellulose and an at least partial coating comprising silica;
wherein the process comprises:
I. providing an aqueous dispersion of the composite reinforcing filler (b);
II. adding, by mixing, the aqueous dispersion of step I. to a latex comprising the vulcanizable diene elastomeric polymer (a);
III. coagulating the latex resulting from step II. so as to obtain a coagulated product comprising the composite reinforcing filler (b);
IV. purifying the coagulated product resulting from step III.

The dispersability and workability properties of the composite reinforcing filler allow an easy and simple dispersion thereof within a polymeric matrix to form a masterbatch, which facilitates the storage, transportation and dosing of the composite reinforcing filler itself and further facilitates its dispersion within the elastomeric composition thereby contributing to improve the reinforcing effect thereof.

In a fifth aspect thereof, the present invention relates to a process for producing a composite reinforcing filler, wherein the process comprises:
(A). dispersing a nanocrystalline cellulose at a temperature ranging from 70 to 90° C. in an aqueous dispersing medium in presence of at least one surfactant selected among cationic surfactants and amphoteric surfactants, so as to obtain an aqueous dispersion comprising nanocrystalline cellulose;
(B). adding at least one precursor compound of silica to the aqueous dispersion resulting from step (A);
(C). depositing an at least partial coating of silica on the nanocrystalline cellulose, by hydrolyzing the precursor compound of silica so as to obtain a composite reinforcing filler that comprises a core comprising nanocrystalline cellulose and an at least partial coating comprising silica;
(D). purifying the composite reinforcing filler resulting from step (C).

The Applicant has in fact found that thanks to the addition of at least one cationic and/or amphoteric surfactant it is possible to provide an aqueous dispersion comprising nanocrystalline cellulose that is particularly stable and capable to facilitate the subsequent deposit thereon of a silica coating from a precursor compound of silica.

In this way, the nanocrystalline cellulose acts as "template" for the silica and facilitates obtaining the anisotropic composite reinforcing filler according to the present invention.

Within the framework of the present description and of the subsequent claims, all the numerical entities indicating amounts, parameters, percentages, and so on should in all circumstances be considered to be preceded by the term "about" unless otherwise indicated. Furthermore, all of the ranges of numerical entities include all the possible combinations of maximum and minimum numerical values and all the possible intermediate ranges, in addition to those specifically indicated hereinbelow.

Within the framework of the present description and of the subsequent claims, the term "phr" (acronym of parts per hundred parts of rubber) indicates the parts by weight of a given component of elastomeric compound per 100 parts by weight of the elastomeric polymer considered net of possible plasticizing extension oils.

Unless otherwise indicated, all the percentages are expressed as percentages by weight.

The present invention can, in one or more of the aforementioned aspects, have one or more of the preferred features given hereinafter, which can be combined as desired depending on the application requirements.

The vulcanizable elastomeric composition according to the present invention comprises 100 phr of at least one vulcanizable diene elastomeric polymer (a).

Preferably, the vulcanizable diene elastomeric polymer (a) that can be used in the present invention can be selected from those commonly used in elastomeric materials that can be cross-linked with sulfur, which are particularly suitable for producing tyres, in other words from elastomeric polymers or copolymers with an unsaturated chain having a glass transition temperature (Tg) generally below 20° C., preferably comprised in the range from 0° C. to −110° C. These polymers or copolymers can be of natural origin or can be obtained by polymerization in solution, polymerization in emulsion or polymerization in gaseous phase of one or more conjugated diolefins, possibly mixed with at least one comonomer selected among monovinylarenes and/or polar comonomers in an amount not greater than 60% by weight.

The conjugated diolefins generally contain from 4 to 12, preferably from 4 to 8 carbon atoms and can be selected, for example from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof. 1,3-butadiene and isoprene are particularly preferred.

Monovinylarenes, which can possibly be used as comonomers, generally contain from 8 to 20, preferably from 8 to 12 carbon atoms and can be selected, for example, from: styrene; 1-vinylnaphthalene; 2-vinylnaphthalene; various alkyl, cycloalkyl, aryl, alkylaryl or aralkyl derivatives of styrene such as, for example, α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixtures thereof. Styrene is particularly preferred.

Polar comonomers, which can possibly be used, can be selected, for example from: vinylpyridine, vinylquinoline, esters of acrylic acid and of alkylacrylic acid, nitriles, or mixtures thereof, such as, for example, methyl acrylate, ethyl acrylate, methyl methacrylate, ethyl methacrylate, acrylonitrile, or mixtures thereof.

Preferably, the vulcanizable diene elastomeric polymer (a) that can be used in the present invention can be selected, for example, from: cis-1,4-polyisoprene (natural or synthetic, preferably natural rubber), 3,4-polyisoprene, polybutadiene (in particular polybutadiene with a high 1,4-cis content), copolymers of isoprene/isobutene possibly halogenated, copolymers of 1,3-butadiene/acrylonitrile, copolymers of styrene/1,3-butadiene, copolymers of styrene/isoprene/1,3-butadiene, copolymers of styrene/1,3-butadiene/acrylonitrile, or mixtures thereof.

According to a preferred embodiment, said vulcanizable elastomeric composition comprises at least 10% by weight, preferably between 20% by weight and 100% by weight, with respect to the total weight of said at least one diene elastomeric polymer (a), of natural rubber.

The aforementioned vulcanizable elastomeric composition can possibly comprise at least one elastomeric polymer of one or more monoolefins with an olefin comonomer or derivatives thereof (a'). The monoolefins can be selected from: ethylene and α-olefin generally containing from 3 to 12 carbon atoms, such as, for example, propylene, 1-butene, 1-pentene, 1-hexene, 1-octene, or mixtures thereof. The following are preferred: copolymers of ethylene and an α-olefin, possibly with a diene; homopolymers of isobutene or copolymers thereof with small amounts of a diene, which are possibly at least partially halogenated. The diene possibly present, generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Among them, the following are particularly preferred: copolymers of ethylene/propylene (EPR) or copolymers of ethylene/propylene/diene (EPDM); polyisobutene; butyl rubbers; halobutyl rubbers, in particular chlorobutyl or bromobutyl rubbers; or mixtures thereof.

It is also possible to use a vulcanizable diene elastomeric polymer (a) or an elastomeric polymer (a') functionalized by reaction with suitable terminating agents or coupling agents. In particular, the diene elastomeric polymers obtained by anionic polymerization in the presence of an organometallic initiator (in particular an organolithium initiator) can be functionalized by reacting the residual organometallic groups derived from the initiator with suitable terminating agents or coupling agents such as, for example, imines, carbodiimides, tin alkyl halides, substituted benzophenones, alcoxysilanes or aryloxysilanes.

The vulcanizable elastomeric composition comprises at least one composite reinforcing filler (b) that comprises a core comprising, preferably consisting of, nanocrystalline cellulose and an at least partial coating comprising, and preferably consisting of, silica.

The composite reinforcing filler (b) is therefore obtained by coupling together different materials so as to synergically exploit the properties thereof and comprises an inner part, or core, that comprises nanocrystalline cellulose and an outer part, or coating, which comprises silica. The coating can be present on a part or advantageously on the entire outer surface of the core, in such a case forming a shell around it. Examples of composites having analogous structure in which the coating covers the entire core are known as composites having a core-shell structure.

Preferably, the composite reinforcing filler (b) has a core-shell structure that comprises a core comprising nanocrystalline cellulose and a shell comprising silica.

Preferably, the composite reinforcing filler (b) has a diameter ranging from 10 nm to 60 nm and a length ranging from 100 nm to 1000 nm.

Preferably, the diameter and the length of the composite reinforcing filler (b) is evaluated by means of microscopic observation, advantageously by means of an electron scanning microscope, preferably carried out on at least 100 particles of composite reinforcing filler (b).

Preferably, the composite reinforcing filler (b) has a crystallinity degree ranging from 10% to 80%, more preferably ranging from 25% to 80%, even more preferably ranging from 35% to 75%, as a function of the weight ratio between nanocrystalline cellulose and silica.

As outlined above, in fact, while the nanocrystalline cellulose has a generally high crystallinity degree, the silica of the coating of the composite reinforcing filler is substantially amorphous.

The crystallinity degree of the composite reinforcing filler (b) can advantageously be measured by means of X-ray diffractometry as indicated above.

Preferably, the composite reinforcing filler (b) has a density ranging from 1.5 to 1.9.

For the purposes of the invention, the density of the composite reinforcing filler (b) can advantageously be measured at 25° C. by means of a helium pycnometer using for example the pycnometer model Accupyc 1330 (Micromeritics) setting a helium pressure during measurement of 1344 hPa and after having conditioned the sample of composite reinforcing filler (b) for 24 hours at 100° C.

In this way, it is advantageously possible to reduce the weight both of the elastomeric composition that incorporates the reinforcing filler, and of the final tyre with respect to the use of silica-based reinforcing fillers.

Preferably, the composite reinforcing filler (b) has total BET surface area measured according to the Standard ISO 5794/1 ranging from 20 to 400 $m^2/g$, preferably from 50 to 250 $m^2/g$.

In a preferred embodiment, the composite reinforcing filler (b) comprises, with respect to the total weight of the composite reinforcing filler (b), from 20% to 80%, more preferably from 30% to 70% and even more preferably from 40% to 60% by weight of silica.

The amount of silica in the composite reinforcing filler (b) can be determined according to any of the methods known for the purpose by those skilled in the art, for example by means of a gravimetric measurement, i.e. by determining the weight of silica in a given amount of reinforcing filler after having removed the other components. For example, the nanocrystalline cellulose can be removed by calcination of the composite reinforcing filler (b) according to any methodology known for the purpose by those skilled in the art, preferably by carrying out said calcination at a temperature of at least 600° C.

Preferably, the vulcanizable elastomeric composition comprises per 100 phr of vulcanizable diene elastomeric polymer (a), from 10 to 100 phr of the composite reinforcing filler (b), more preferably from 15 to 50 phr of the composite reinforcing filler (b).

In a preferred embodiment and in order to satisfy specific application requirements, the vulcanizable elastomeric composition according to the present invention comprises (c) a standard reinforcing filler.

Preferably, the standard reinforcing filler is selected among carbon black, precipitated amorphous silica, amorphous silica of natural origin, silicate fibers, or mixtures thereof.

Preferably, the standard reinforcing filler (c) is present in the vulcanizable elastomeric composition in an amount generally ranging from 1 phr to 120 phr, preferably from 20 phr to 90 phr.

Preferably, the standard reinforcing filler (c) is carbon black having a surface area not lower than 20 $m^2/g$ (determined by STSA—statistical thickness surface area according to ISO 18852:2005) Preferably, said carbon black reinforcing filler (c) is present in the vulcanizable elastomeric composition in an amount ranging from 1 phr to 120 phr, preferably from 20 phr to 90 phr.

Preferably, the standard reinforcing filler is silica, selected among a pyrogenic silica or, preferably a precipitated silica.

Preferably, the silica has a BET surface area (measured according to the Standard ISO 5794/1) ranging from 50 $m^2/g$ to 500 $m^2/g$, more preferably from 70 $m^2/g$ to 200 $m^2/g$.

Preferably, in the vulcanizable elastomeric composition the composite reinforcing filler (b) constitutes at least 75% by weight, more preferably at least 80% by weight, with respect to the total weight of the white reinforcing fillers.

Within the framework of the present description and of the subsequent claims, the expression "white reinforcing fillers" indicates the reinforcing fillers of the vulcanizable elastomeric composition with the exclusion of the carbon black-based fillers. Typical examples of white reinforcing fillers are gypsum, talc, kaolin, bentonite, titanium dioxide and silica, in the form of precipitated amorphous silica, amorphous silica of natural origin, silicate fibers, or mixtures thereof.

The vulcanizable elastomeric composition according to the present invention comprises at least one vulcanizing agent (d).

The vulcanizing agent most advantageously used is sulfur, or alternatively molecules containing sulfur (sulfur donors), with accelerators, activators and/or retardants known by those skilled in the art.

The sulfur or derivatives thereof can advantageously be selected, for example, among: (i) soluble sulfur (crystalline sulfur); (ii) insoluble sulfur (polymeric sulfur); (iii) oil dispersed sulfur (for example 33% sulfur known by the trade name of Crystex OT33 by Eastman); (iv) sulfur donors such as, for example, caprolactam disulfide (CLD), bis[(trialkoxysilyl)propyl]polysulfides, dithiophosphates; or mixtures thereof.

The vulcanizing agent (d) is present in the vulcanizable elastomeric composition of the invention in amounts from 0.1 to 15 phr, preferably from 1 to 10 phr, even more preferably from 2 to 7 phr.

The vulcanizable elastomeric composition according to the present invention further comprises at least one silane coupling agent (e) capable of interacting with the silica possibly present as reinforcing filler and/or the silicates and of bonding them to the diene elastomeric polymer during vulcanization.

Preferably, the silane coupling agent (e) used in the present invention is selected among those having at least one hydrolysable silane substituting group, silane that can be identified, for example, by the following general formula (IV):

$$(R)_3Si\text{—}C_nH_{2n}\text{—}X \qquad (IV)$$

where the R groups, which can be identical or different, are selected among: alkyl, alkoxy or aryloxy groups or halogen atoms, provided that at least one of the R groups is an alkoxy or aryloxy group or a halogen; n is an integer between 1 and 6 inclusive; X is a group selected among: nitrose, mercapto, amino, epoxy, vinyl, imide, chlorine, —$(S)_mC_nH_{2n}$—Si—$(R)_3$ and —S—COR, where m and n are integers between 1 and 6 inclusive and the R groups are defined as above.

Among the silane coupling agents (e), the particularly preferred ones are bis(3-triethoxysilylpropyl) tetrasulfide and bis(3-triethoxysilylpropyl) disulfide. Said coupling agents can be used as such or mixed with an inert filler (for example carbon black) so as to facilitate their incorporation in the vulcanizable elastomeric composition.

Preferably, said silane coupling agent (e) is present in the vulcanizable elastomeric composition in an amount ranging from 0.1 phr to 15 phr, preferably from 0.5 phr to 10 phr.

Preferably, the silane coupling agent (e) and the vulcanizing agent (d) are used in combination with accelerators (f) and/or activators (g) known by those skilled in the art.

The accelerators (f) that are commonly used can be selected among: dithiocarbamates, guanidine, thiourea, thiazoles, sulfenamides, thiourames, amines, xanthates, or mixtures thereof.

Preferably, the vulcanization accelerators (f) are present in the vulcanizable elastomeric composition of the invention in amounts from 0.1 to 8 phr, preferably from 0.3 to 6 phr.

The activators (g) that are particularly effective are zinc compounds and in particular ZnO, $ZnCO_3$, zinc salts of saturated or unsaturated fatty acids containing from 8 to 18 carbon atoms, such as, for example, zinc stearate, which are preferably formed in situ in the vulcanizable elastomeric composition from ZnO and a fatty acid, or mixtures thereof.

Preferably, the vulcanization activators (g) are present in the vulcanizable elastomeric composition of the invention in amounts from 0.2 to 15 phr, preferably from 0.5 to 10 phr.

Finally, the vulcanizable elastomeric materials according to the invention can comprise other commonly used additives, selected on the basis of the specific application which the composition is intended for. For example, said materials can be added with: anti-oxidants, anti-ageing agents, plasticizers, adhesives, anti-ozone agents, modifying resins, or mixtures thereof.

In particular, in order to further improve workability, said vulcanizable elastomeric composition can be added with plasticizers generally selected among mineral oils, vegetable oils, synthetic oils, liquid polymers, or mixtures thereof, such as, for example, aromatic oil, naphthenic oil, phthalates, soy oils, or mixtures thereof. The amount of plasticizer is generally ranging from 0 phr to 70 phr, preferably from 5 phr to 30 phr.

The vulcanizable elastomeric composition illustrated above is advantageously vulcanized to obtain at least one structural element of the tyre for vehicle wheels according to the invention.

Preferably, the structural element is selected in the group comprising tread band, carcass structure, belt structure, underlayer, antiabrasive strip, sidewall, sidewall insert, mini-sidewall, flipper, chafer, underliner, rubber layers, bead filling and rubber sheets.

Preferably, in the tyre according to the invention at least the tread band and at least one component selected among underlayer, antiabrasive strip, sidewall, sidewall insert, mini-sidewall, flipper, chafer, underliner, rubber layers, bead filling or rubber sheet comprise said vulcanized elastomeric material obtained by vulcanizing a vulcanizable elastomeric composition comprising the reinforcing filler according to the invention.

An embodiment according to the present invention relates to a tyre for vehicles comprising at least:
- a carcass structure comprising at least one carcass layer having opposite lateral edges associated to respective bead structures;
- a belt structure applied at a radially outer position with respect to the carcass structure,
- a tread band applied at a radially outer position with respect to said belt structure, and possibly at least
- an underlayer and/or an antiabrasive strip and/or a sidewall and/or a sidewall insert and/or a mini-sidewall and/or an underliner and/or a rubber layer and/or flipper and/or chafer and/or a bead filling and/or a rubber sheet, wherein at least one among said carcass structure and/or tread band and/or belt structure and/or underlayer and/or antiabrasive strip and/or sidewall and/or sidewall insert and/or a mini-sidewall and/or underliner and/or rubber layer and/or flipper and/or chafer and/or bead filling and/or rubber sheet, comprises a vulcanized elastomeric material obtained by vulcanizing a vulcanizable elastomeric composition comprising the reinforcing filler according to the invention.

Preferably, the tyre according to the invention comprises a vulcanized elastomeric material obtained by vulcanizing a vulcanizable elastomeric composition comprising the reinforcing filler according to the invention at least in the tread band.

Preferably, the tyre according to the invention comprises a vulcanized elastomeric material obtained by vulcanizing a vulcanizable elastomeric composition comprising the reinforcing filler according to the invention at least in the underlayer.

Preferably, the tyre according to the invention comprises a vulcanized elastomeric material obtained by vulcanizing a vulcanizable elastomeric composition comprising the reinforcing filler according to the invention at least in the sidewall insert.

Preferably, the tyre according to the invention comprises a vulcanized elastomeric material obtained by vulcanizing a vulcanizable elastomeric composition comprising the reinforcing filler according to the invention in the tread band and in one or more components selected among underlayer, antiabrasive strip, sidewall, sidewall insert, mini-sidewall, underliner, rubber layers, bead filling and rubber sheet.

Preferably, the tyre according to the invention comprises a vulcanized elastomeric material obtained by vulcanizing a vulcanizable elastomeric composition comprising the reinforcing filler according to the invention in the tread band and in the underlayer.

Preferably, the tyre according to the invention comprises a vulcanized elastomeric material obtained by vulcanizing a vulcanizable elastomeric composition comprising the reinforcing filler according to the invention in the tread band and in the sidewall.

In an embodiment thereof, the tyre according to the present invention is a tyre for high and ultra high performance vehicles HP and UHP, the performance of which benefits particularly from the high reinforcing power coupled with the lightness of the composite reinforcing filler (b) according to the present invention.

The tyre according to the invention can be used on two or four-wheeled vehicles, on heavy vehicles, or on light transportation vehicles.

The tyre according to the invention can be for summer or winter use or for all seasons.

In a preferred embodiment of the process for producing a tyre for vehicle wheels according to the invention, the step of providing a vulcanizable elastomeric composition can be carried out according to any one of the methods known by those skilled in the art and capable to disperse the composite reinforcing filler (b) in the vulcanizable diene elastomeric polymer (a).

Preferably, the step of providing a vulcanizable elastomeric composition comprises:
- feeding to at least one mixing apparatus comprising at least one discontinuous mixer and/or at least one continuous mixer at least the following components:
  - the vulcanizable diene elastomeric polymer (a),
  - the composite reinforcing filler (b);
- mixing and dispersing said components so as to obtain said vulcanizable elastomeric composition;
- discharging said vulcanizable elastomeric composition from said mixing apparatus.

Within the framework of the present description and of the subsequent claims, the term "discontinuous (or batch) mixer (or mixing device)" indicates a mixing device configured to be periodically fed with the various ingredients of the material to be prepared in predetermined amounts and to mix them for a predetermined time so as to obtain a batch of said material.

At the end of the mixing step, the entire batch of material obtained is completely discharged from the mixing device in a single operation. Examples of batch or discontinuous mixers are internal mixers of the type with tangential rotors (Banbury®) or with interpenetrating rotors (Intermix®).

Within the framework of the present description and of the subsequent claims, the term "continuous mixer (or mixing device)", indicates a mixing device configured to be continuously fed with the ingredients of the material to be prepared, typically by means of controlled-dose dosing devices, to mix the ingredients in order to produce the material and to discharge the same in a continuous flow (except for possible stops of the mixing device due to maintenance, or change of recipe of the material).

In the jargon of mixers for elastomeric compounds, the continuous mixing device is sometimes indicated with the term of: mixing extruder, which is considered herein equivalent to 'continuous mixer'.

The continuous mixer (in particular the active elements thereof such as the screws or the mixing satellites) is thus equipped with mixing portions capable of imparting to the material under mixing a high shear stress, and, interspersed with the mixing portions, with transport portions capable of imparting a thrust to the material being processed to advance it from one longitudinal end of the inner chamber to the other. The continuous mixer can be further equipped with possible redistribution portions.

Examples of continuous mixing devices are twin-screw mixers or multi-screw mixers (for example ring mixers), interpenetrating and co-rotating, or of the planetary type.

Both the discontinuous mixer, and the continuous mixer, are capable of imparting to the material to be produced with them with sufficient energy to mix and homogeneously disperse the various components also in the case of cold feeding of the ingredients and, in the case of a material comprising an elastomeric component, to masticate the elastomeric compound raising the temperature thereof so as to make it workable and plastic to facilitate the incorporation and/or the distribution of the ingredients in the elastomeric polymeric matrix.

The vulcanizable elastomeric composition thus obtained can thus be stored or sent directly to the subsequent production steps of the tyre according to the present invention.

The composite reinforcing filler (b) can be fed to said at least one discontinuous mixer and/or to at least one continuous mixer according to any way known by those skilled in the art and suitable for the purpose.

For example, the composite reinforcing filler (b) according to the present invention can be fed in the form of a powdered material or in the form of a masterbatch.

Preferably, the composite reinforcing filler (b) according to the present invention is fed to said at least one discontinuous mixer and/or to said at least one continuous mixer in the form of a masterbatch comprising:

at least one vulcanizable diene elastomeric polymer (a) as described above;

the composite reinforcing filler (b).

Advantageously, the feeding of the masterbatch according to the present invention facilitates and improves the dispersion of the composite reinforcing filler in the elastomeric composition, thereby improving the reinforcing effect carried out by the filler itself.

Preferably, the vulcanizable diene elastomeric polymer (a) of the masterbatch according to the present invention is any vulcanizable diene elastomeric polymer (a) as stated above.

Preferably, the composite reinforcing filler (b) of the masterbatch according to the present invention is any composite reinforcing filler (b) as stated above.

Preferably, the masterbatch according to the present invention comprises per 100 phr of vulcanizable diene elastomeric polymer (a), from 5 to 120 phr, preferably from 5 to 80 phr of the composite reinforcing filler (b) according to the present invention.

According to this preferred embodiment, the amount of composite reinforcing filler (b) is suitably varied, with respect to the amount of vulcanizable diene elastomeric polymer (a), as a function of the specific type of use of the masterbatch.

Thus, for example, if the vulcanizable diene elastomeric polymer (a) of the masterbatch is used to constitute 100% of the polymeric base of a specific tyre structural element, then the amount of composite reinforcing filler (b) in the masterbatch can vary between 5 phr and 100 phr per 100 phr of the vulcanizable diene elastomeric polymer (a).

On the other hand, if the vulcanizable diene elastomeric polymer (a) of the masterbatch is used in mixture with other polymers, then the amount of composite reinforcing filler (b) in the masterbatch can have values greater than 100 phr and vary between 5 phr and 120 phr per 100 phr of the vulcanizable diene elastomeric polymer (a).

The masterbatch according to the present invention, in addition to being advantageously usable in the process for producing a tyre for vehicle wheels as stated above, is particularly advantageous also in terms of storage and transportation of the composite reinforcing filler (b) and can be stored or directly forwarded to the subsequent tyre production steps according to the present invention immediately after its production.

As outlined above, the process for producing the masterbatch comprises I. providing an aqueous dispersion of the composite reinforcing filler (b).

Preferably, the aqueous dispersion obtained from step I. of the process for producing a masterbatch according to the invention comprises between 2 and 6% of the composite reinforcing filler (b).

The aqueous dispersion of the composite reinforcing filler (b) can be provided according to any of the methods known by those skilled in the art and may include the use of different means, for example a bladed mechanical stirrer, a mechanical mixer, for example of the type used to mix paints or mortars, a magnetic stirrer or may include sonication.

Preferably, in the process for producing the masterbatch the aforementioned step III. of coagulating the latex resulting from the aforementioned step II. comprises adding an acid, so as to bring the pH below 4.

Preferably, the acid is selected from the group comprising acetic acid, sulfuric acid, carbonic acid, formic acid, or a mixture thereof.

Other aspects of step III. of coagulating the latex resulting from the aforementioned step II. are known to those skilled in the art and are not therefore detailed any further here.

Preferably, the aforementioned step IV. of purifying the coagulated product comprises at least one operation selected from the group comprising filtration, washing, centrifuging, drying, lyophilization.

Other aspects of the aforementioned step IV. of purifying the coagulated product are known to those skilled in the art and are not therefore detailed any further here.

Examples of nanocrystalline cellulose that can be used according to the present invention are the products commercialized by CelluloseLab (Canada), by Melodea Ltd, Rohovot. Israel, by American Process Inc., Atlanta, Ga., U.S.A. with the trademark BioPlus®, by Celluforce Inc, Montreal, Quebec, Canada, with the trade mark Celluforce NCC®.

Preferably, the nanocrystalline cellulose has a diameter ranging from 5 nm to 30 nm and a length ranging from 100 nm to 1000 nm, more preferably ranging from 100 nm to 500 nm.

Preferably, the diameter and the length of the nanocrystalline cellulose are evaluated by means of microscopic observation, more preferably by means of an electron-scanning microscope, preferably carried out on at least 100 particles of nanocrystalline cellulose.

Preferably, the nanocrystalline cellulose has a crystallinity degree greater than 40%, more preferably greater than 50%, even more preferably greater than 60%, and still more preferably ranging from 70% to 95%, measured according to the method for determining the crystallinity degree given above for the composite reinforcing filler.

Preferably, the nanocrystalline cellulose has a density ranging from 1.4 to 1.6 $g/cm^3$ as a function of the extraction method and the humidity content.

More preferably, the nanocrystalline cellulose has a density of about 1.5 $g/cm^3$ measured by means of an helium pycnometer as indicated above.

Preferably, the surfactant used in the process for producing the composite reinforcing filler of the invention is selected from the group comprising benzalkonium chloride, cetrimonium chloride, hexadecyltrimethylammonium bromide, undecyl amido propyl trimethylammonium metasulphate, for example commercialized with the name of Servamine Q8040 by Elementis Specialty Products, Delden, The Netherlands, coco alkyl trimethylammonium metasulphate, for example commercialized with the name of Servamine KAC 458 by Elementis Specialty Products, Delden, The Netherlands.

More preferably, the surfactant is hexadecyltrimethylammonium bromide.

Preferably, the surfactant is added in an amount ranging from 10 to 20% by weight with respect to the weight of the nanocrystalline cellulose.

Preferably, the aqueous dispersing medium used in the process for producing the composite reinforcing filler of the invention is used in a volume/weight ratio with respect to the nanocrystalline cellulose ranging from 0.05 to 0.2 l/g.

Within the framework of the process for producing a composite reinforcing filler according to the invention, the term "precursor compound of silica" is used to indicate, in the present description and in the subsequent claims, a compound or a mixture of compounds capable of generating silica by hydrolysis in situ, for example by heating and/or in the presence of acids or bases.

Preferably, the aforementioned precursor compound of silica is selected among:

I. Alkaline Silicates, of Formula $$M_2O \cdot nSiO_2 \quad (I)$$

where M=Na, K, Li and where n is ranging from 0.5 to 4, preferably n=0.5 or 1 or 3 and M=Na or K, which generate silica in the presence of acids, II. Tetra-Alkyl Derivatives of Silicic Acid (or Tetra-Alkoxy-Silanes) of Formula $$(RO)_4Si \quad (II)$$

wherein the R groups, equal or different from each other, represent $C_1$-$C_6$ alkyls, that generate silica in the presence of water and, preferably, acids or bases, III. Halosilanes of Formula $$SiX_4 \text{ or } (RO)_3SiX \text{ or } (RO)_2SiX_2 \text{ or } (RO)SiX_3 \quad (III)$$

wherein the R groups, equal or different from each other, represent $C_1$-$C_6$ alkyls, and X, equal or different from each other, are selected among chlorine, bromine and iodine, preferably chlorine, which generate silica in the presence of water and, possibly, bases.

Generally, the hydrolysis of the precursor compound of silica requires the presence of water in an amount in equivalents at least equal to the equivalents of hydrolysable groups present in the precursor compound of silica. Those skilled in the art are therefore capable of exactly determining the amount of water necessary for the hydrolysis of the precursor compound knowing the amount thereof that it is used during the step (B) of the process.

Preferably, the precursor compound is dissolved or suspended in a liquid medium comprising water.

Preferably, in a first variant of the process the precursor compound of silica is an alkaline silicate (I).

According to said first variant, the addition of the precursor compound of silica is preferably carried out keeping said aqueous dispersion in a basic medium at a temperature ranging from 70 to 90° C.

Preferably, said basic medium of step (B) has a pH ranging from 7 to 9.5.

According to said first variant, the alkaline silicate (I) is preferably selected in the group comprising sodium silicate, lithium silicate, potassium silicate, more preferably sodium orthosilicate, sodium metasilicate and potassium orthosilicate.

Preferably, a sodium silicate having a ratio $SiO_2/Na_2O$ between 2 and 4, more preferably between 3 and 3.7 is used.

More preferably, the alkaline silicate (I) is in the form of aqueous solution having a solid content ranging from 5% to 15% by weight.

According to the aforementioned first variant in which the precursor compound of silica is an alkaline silicate (I), the amount of alkaline silicate (I) added in step (B) is preferably ranging from 50 to 150% by weight with respect to the weight of the nanocrystalline cellulose.

According to the aforementioned first variant, the step (B) preferably comprises adding at least one acid selected from the group comprising hydrochloric acid, phosphoric acid, nitric acid, sulfuric acid, acetic acid, carbonic acid.

Preferably, the amount of acid used is at least capable to neutralize all of the basic functionalities of the starting silicates.

Preferably, the acid is used in a weight ratio ranging from 1:1 to 1:20 with respect to the weight of the alkaline silicate (I).

According to the aforementioned first variant in which the precursor compound of silica is an alkaline silicate (I), in step (B) of the process for producing the composite reinforcing filler according to the present invention the aqueous dispersion is preferably stirred, after the end of the alkaline silicate addition, for a time ranging from 30 to 90 minutes at a temperature ranging from 70 to 90° C.

In a preferred embodiment, the step (B) of the process for producing the composite reinforcing filler according to the aforementioned first variant of the process according to the present invention comprises:

(B1) adding at least one first portion of alkaline silicate (I) to the aqueous dispersion resulting from step (A), wherein the addition is carried out while keeping the aqueous dispersion at a pH ranging from 8.5 to 9.5;

(B2) stirring the aqueous dispersion resulting from step (B1) for a time ranging from 80 to 100 minutes;

(B3) adding at least one second portion of alkaline silicate (I) to the aqueous dispersion resulting from step (B2), wherein the addition is carried out while keeping the aqueous dispersion at a pH ranging from 7 to 8.

According to said first variant of the process in which the precursor compound of silica is an alkaline silicate (I), the step (C) of depositing an at least partial coating of silica on the nanocrystalline cellulose preferably comprises bringing the aqueous dispersion resulting from step (B) in an acidic medium so as to hydrolyze the alkaline silicate (I) and obtain a composite reinforcing filler that comprises a core comprising nanocrystalline cellulose and an at least partial coating comprising silica.

Preferably, the acidic medium of step (C) according to said first variant has a pH ranging from 3.5 to 4.5.

According to the aforementioned first variant in which the precursor compound of silica is an alkaline silicate (I), the step (C) of the process for producing a reinforcing filler preferably comprises adding at least one acid selected from the group comprising hydrochloric acid, phosphoric acid, nitric acid, sulfuric acid, acetic acid, carbonic acid.

Preferably, in a second variant of the process for producing a reinforcing filler according to the invention, the precursor compound of silica is a tetra-alkyl derivative of silicic acid (II) selected, preferably, among tetra-methyl orthosilicate, tetra-ethyl orthosilicate, tetra n-propyl silicate, tetra-n-butyl silicate.

In this case, the precursor is advantageously hydrolyzed in the presence of acids or bases, preferably bases.

As far as the acids are concerned, in said second variant it is possible to use the acids described above with reference to the first variant of the process.

As far as the bases are concerned, these are preferably selected among ammonia, ammonium hydroxide, hydroxylamine, primary, secondary or tertiary alkyl, aryl or arylalkyl amines, sodium hydroxide, potassium hydroxide.

More preferably, the precursor is advantageously hydrolyzed in the presence of ammonia or ammonium hydroxide.

According to the aforementioned second variant of the process for producing a reinforcing filler according to the invention, the bases are preferably used in amounts ranging from 1 to 40% by weight, more preferably between 3 and 20% by weight, with respect to the weight of precursor compound of silica.

In a preferred embodiment of the process for producing a reinforcing filler according to the invention, the step (D) of purifying the composite reinforcing filler preferably comprises at least one operation selected from the group comprising filtration, washing, centrifuging, drying, lyophilization, or any combination thereof.

Preferably, the step (D) of purifying the composite reinforcing filler comprises at least one washing operation, more preferably carried out with an aqueous medium, so as to allow the removal of the surfactant used in step (A) of the process for producing the composite reinforcing filler (b) according to the present invention.

Preferably, the composite reinforcing filler resulting from step (C) of the process for producing a reinforcing filler according to the invention is any composite reinforcing filler (b) as described above.

BRIEF DESCRIPTION OF THE FIGURES

Additional features and advantages of the invention will become clearer from the following description of some preferred embodiments thereof, made hereinafter, for illustrating and not limiting purposes, with reference to the attached drawings.

In the drawings.

DETAILED DESCRIPTION OF THE CURRENTLY PREFERRED EMBODIMENTS

Figure 1:
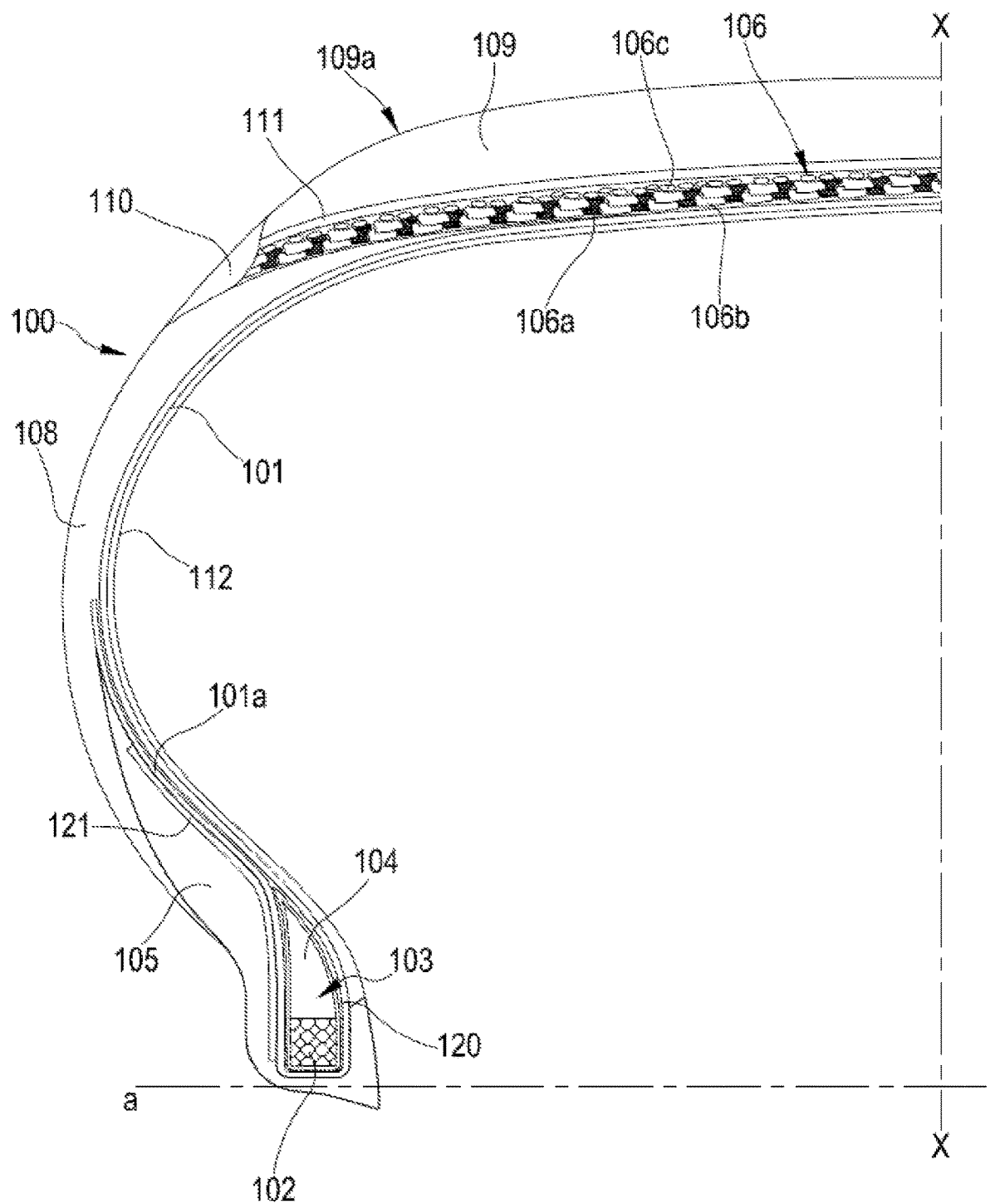
FIG. 1 illustrates a radial half-section of a tyre for vehicle wheels according to the invention.

A tyre for vehicle wheels according to a preferred embodiment of the invention is generally indicated with reference numeral 100 in FIG. 1.

FIG. 1 illustrates a radial half-section of a tyre for vehicle wheels.

In FIG. 1 "a" indicates an axial direction and "X" indicates a radial direction, in particular X-X indicates the line of the equatorial plane. For the sake of simplicity, FIG. 1 shows only a portion of the tyre, the remaining unrepresented portion being identical and symmetrically arranged with respect to the equatorial plane "X-X".

The tyre 100 for vehicles comprises at least one carcass structure, comprising at least one carcass layer 101 having respectively opposite end flaps engaged with respective annular anchoring structures 102, called bead cores, possibly associated to a bead filler 104.

The zone of the tyre comprising the bead core 102 and the filler 104 forms a bead structure 103 intended for anchoring the tyre on a corresponding mounting rim, not illustrated.

The carcass structure is usually of the radial type, i.e. the reinforcing elements of the at least one carcass layer 101 are on planes comprising the rotation axis of the tyre and substantially perpendicular to the equatorial plane of the tyre. Said reinforcing elements generally consist of textile cords, for example rayon, nylon, polyester (for example polyethylene naphthalate, PEN). Each bead structure is associated to the carcass structure by folding back of the opposite lateral edges of the at least one carcass layer 101 around the annular anchoring structure 102 so as to form the so-called flaps of the carcass 101a as illustrated in FIG. 1.

In an embodiment, the coupling between the carcass structure and the bead structure can be provided by a second carcass layer (not shown in FIG. 1) applied at an axially outer position with respect to the first carcass layer.

An anti-abrasive strip 105 is arranged at an outer position of each bead structure 103.

The carcass structure is associated to a belt structure 106 comprising one or more belt layers 106a, 106b radially superimposed on one another and with respect to the carcass layer, having typically textile and/or metallic reinforcing cords incorporated in a layer of vulcanized elastomeric material.

Such reinforcing cords can have a crossed orientation with respect to a direction of circumferential development of the tyre 100. The term "circumferential" direction is used to indicate a direction generally facing the direction of rotation of the tyre.

At a radially outermost position with respect to the belt layers 106a, 106b, at least one zero degrees reinforcing layer 106c may be applied, commonly known as "0° belt", which generally incorporates a plurality of elongated reinforcement elements, typically metallic or textile cords, oriented along a substantially circumferential direction, thus forming an angle of a few degrees (for example an angle between about 0° and 6°) with respect to a direction parallel to the equatorial plane of the tyre, and coated with a vulcanized elastomeric material.

At a radially outer position with respect to the belt structure 106, a tread band 109 made of vulcanized elastomeric material is applied.

On the lateral surfaces of the carcass structure, each extending from one of the lateral edges of the tread band 109 up to the respective bead structure 103, respective sidewalls 108 made of vulcanized elastomeric material are also applied at an axially outer position.

At a radially outer position, the tread band 109 has a rolling surface 109a intended to contact the ground. Circumferential grooves, which are connected by transversal notches (not shown in FIG. 1) so as to define a plurality of blocks of various shapes and sizes distributed on the rolling surface 109a, are generally formed in this surface 109a, which for the sake of simplicity in FIG. 1 is represented smooth.

An underlayer 111 made of vulcanized elastomeric material can be arranged between the belt structure 106 and the tread band 109.

A strip 110 of vulcanized elastomeric material, commonly known as "mini-sidewall", can possibly be present in the connection zone between the sidewalls 108 and the tread band 109.

This mini-sidewall 110 is generally obtained by co-extrusion with the tread band 109 and advantageously allows an improvement of the mechanical interaction between the tread band 109 and the sidewalls 108.

Preferably, the end portion of the sidewall 108 (in the preferred embodiment illustrated in FIG. 1, of the mini-sidewall 110) directly covers the lateral edge of the tread band 109.

In the case of tyres without an air chamber, a rubber layer 112, generally known as "liner", which provides the necessary tightness to the inflation air of the tyre, can also be provided at a radially inner position with respect to the carcass layer 101.

Between the rubber layer 112 and the carcass layer 101 it is also possible to arrange a further rubber sheet of vulcanized elastomeric material, not illustrated, also known with the name of "underliner".

The stiffness of the tyre sidewall 108 can be improved by providing the bead structure 103 with a reinforcing layer 120 generally known as "flipper" or additional strip-shaped insert.

The flipper 120 is a reinforcing layer that is wound around the respective bead core 102 and the bead filling 104 so as to at least partially surround them, said reinforcing layer being arranged between the at least one carcass layer 101 and the bead structure 103.

Preferably, the flipper is in contact with the aforementioned at least one carcass layer 101 and with the bead structure 103.

The flipper 120 typically comprises a plurality of textile cords incorporated in a layer of vulcanized elastomeric material.

The tyre bead structure 103 can comprise an additional protective layer 121, generally known with the term of "chafer" or protective strip, and which has the function of increasing the stiffness and integrity of the bead structure 103.

Preferably, the protective layer 121 or "chafer" comprises a plurality of cords incorporated in a layer of vulcanized elastomeric material. Such cords can be made of textile materials (for example aramid or rayon) or of metallic materials (for example steel cords).

A layer or rubber sheet of elastomeric material, not shown, can be arranged between the belt structure 106 and the carcass structure. The layer can have a uniform thickness.

Alternatively, the layer can have a variable thickness along the axial direction. For example, the layer can have a greater thickness close to its axially outer edges with respect to the central (crown) zone.

Advantageously, the layer or rubber sheet can extend over a surface substantially corresponding to the development surface of the belt structure 106.

In a preferred embodiment, a layer or rubber sheet of elastomeric material as described above, not shown, can be arranged—alternatively or additionally to the underlayer 111—between the belt structure 106 and the tread band 109, said additional layer or rubber sheet preferably extending over a surface substantially corresponding to the development surface of the belt structure 106.

The vulcanized elastomeric material obtained by vulcanizing the vulcanizable elastomeric composition comprising the composite reinforcing filler (b) according to the present invention can be advantageously incorporated in one or more of the structural elements of the tyre 100 described above.

Preferably, the structural element of the tyre 100 obtained by vulcanizing the vulcanizable elastomeric composition comprising the composite reinforcing filler (b) according to the present invention can be one or more among the tread band 109, carcass structure, belt structure 106, underlayer 111, antiabrasive strip 105, sidewall 108, sidewall insert, mini-sidewall 110, flipper 120, chafer 121, underliner, rubber layers, bead filling 104 and rubber sheets of vulcanized elastomeric material.

According to an embodiment which is not shown, the tyre can be a tyre for motorcycle wheels that is typically a tyre that has a cross section distinguished by a high transversal curvature.

According to an embodiment which is not shown, the tyre can be a tyre for wheels for heavy transportation vehicles, such as trucks, buses, trailers, vans, and in general for vehicles in which the tyre is subjected to a high load.

Preferably, such a tyre is suitable for being mounted on rims having a diameter equal to or greater than 17.5 inches for steering or trailer wheels.

The invention is now illustrated by some Examples intended for illustrative and non-limiting purposes thereof.

Example 1

Preparation of a Composite Reinforcing Filler
Materials

Nanocrystalline cellulose (aqueous dispersion at 12% by weight—commercialized by CelluloseLab—Canada) having a diameter ranging from 5 to 20 nm and a length ranging from 150 to 200 nm, density of 1.5 g/cm$^3$, surface area of 1.45 m$^2$/g, crystallinity degree of 70-90%);

Hexadecyltrimethylammonium bromide (CTAB) (Sigma-Aldrich);

Silica: Ultrasil VN3;

NaOH at 98% (Sigma);

Sulfuric acid (aqueous solution at 15% by weight) (obtained by dilution by the product of Sigma-Aldrich, 98%).

Procedure

In a laboratory flask, 7 g of silica and 2.8 g of NaOH were mixed in 60 ml of distilled water and kept under agitation at 300 rpm at 80° C. for 1 hour, obtaining a clear solution of sodium silicate, which was then brought to a final volume of 90 ml by adding further distilled water.

Thereafter, in a three-necked laboratory flask 42 g of the aqueous dispersion of nanocrystalline cellulose (corresponding to 5 g of nanocrystalline cellulose) and 0.8 g of CTAB were added in 450 ml of distilled water and kept under agitation for 30 minutes at about 80° C., so as to form an aqueous dispersion of nanocrystalline cellulose.

Always keeping the system at a temperature of about 80° C., the aqueous dispersion of nanocrystalline cellulose was added with a first portion of 60 ml of the sodium silicate solution over about 90 minutes. During the addition of the sodium silicate solution, sulfuric acid was also added, so as to keep the pH at a value of about 9.3.

Once the addition of the first portion of sodium silicate ended, the reaction mixture was kept under agitation for additional 15 minutes at about 80° C. and, thereafter, sulfuric acid was added over 10 minutes, until a pH of about 7.5 was attained, always keeping the temperature at about 80° C.

Then, a second portion of 30 ml of the sodium silicate solution was added over about 45 minutes to the aqueous dispersion thus obtained, keeping the system at the temperature of about 80° C. and at a pH value of about 7.4, by adding sulfuric acid.

Figure 2:
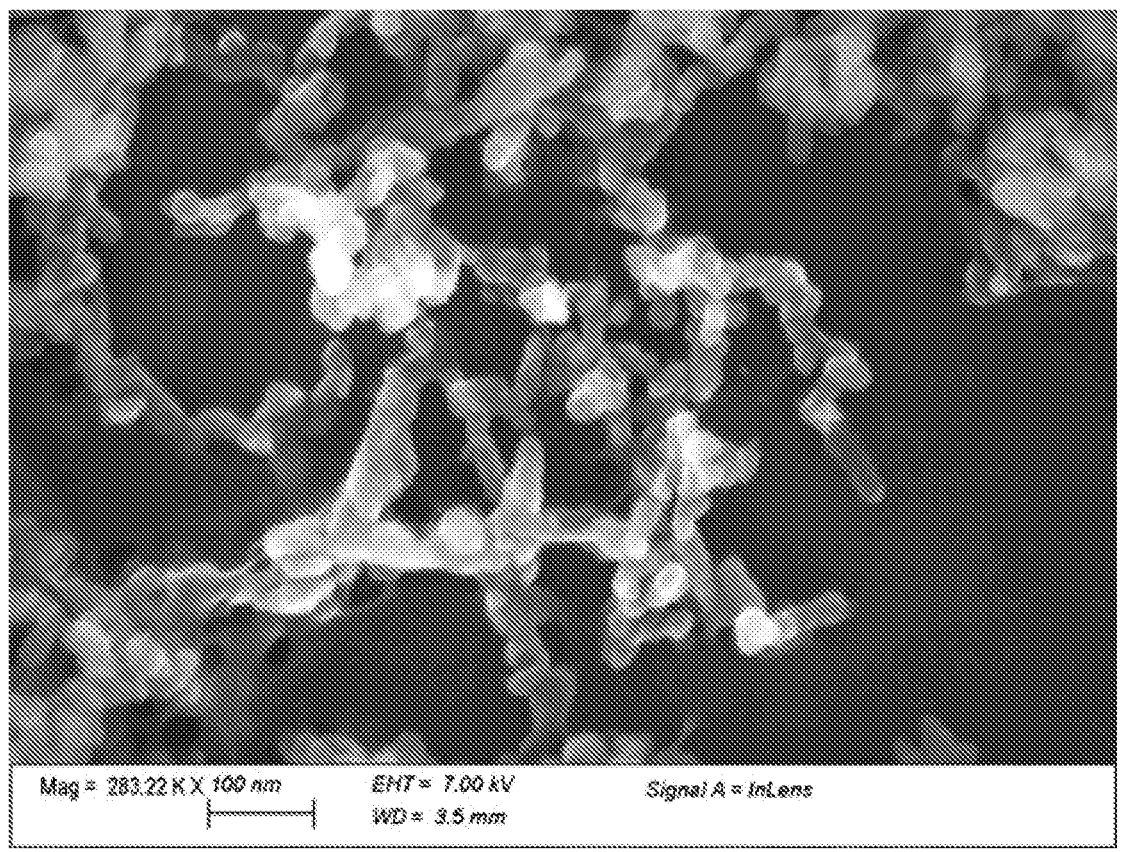
FIG. 2 illustrates a photograph carried out with a field emission scanning electron microscope (FESEM), obtained with an ULTRA PLUS instrument with Gemini lens by ZEISS, in which it is possible to see the composite reinforcing filler (b) according to Example 1. At the bottom, a reference scale is shown which allows to appreciate the dimensions of the composite reinforcing filler (b).

Once the addition of sodium silicate solution ended, the pH was brought to a value of 4 over 20 minutes by adding further sulfuric acid and by keeping the reaction mixture always at about 80° C., so as to deposit a silica coating on the nanocrystalline cellulose, thereby obtaining about 11 g of a composite reinforcing filler. The composite reinforcing filler thus obtained was then purified by means of centrifuging (1000-3000 g for 10-20 minutes), followed by washing with distilled water and lyophilization (24 hours) and subsequently characterized. Table 1 shows the characteristics of the composite reinforcing filler. FIG. 2 also shows an electron scanning microscope photograph of the composite reinforcing filler obtained.

Example 2

Preparation of a Composite Reinforcing Filler
Materials

Nanocrystalline cellulose (aqueous dispersion at 12% by weight—commercialized by CelluloseLab—Canada) having a diameter ranging from 5 to 20 nm and a length ranging from 150 to 200 nm, density of 1.5 g/cm$^3$, surface area of 1.45 m$^2$/g, crystallinity degree of 70-90%);

Hexadecyltrimethylammonium bromide (CTAB) (Sigma-Aldrich);

Silica: Ultrasil VN3;

NaOH at 98% (Sigma);

Sulfuric acid: (aqueous solution at 15% by weight) (obtained by dilution by the product of Sigma-Aldrich, 98%).
Procedure In a laboratory flask, 7 g of silica and 2.8 g of NaOH were mixed in 60 ml of distilled water and kept under agitation at 300 rpm at 80° C. for 1 hour, obtaining a clear solution of sodium silicate, which was then brought to a final volume of 100 ml by adding further distilled water.

Thereafter, in a three-necked laboratory flask 42 g of the aqueous dispersion of nanocrystalline cellulose (corresponding to 5 g of nanocrystalline cellulose) and 0.8 g of CTAB were added in 450 ml of distilled water and kept under agitation for 30 minutes at about 80° C., so as to form an aqueous dispersion of nanocrystalline cellulose.

While keeping the system at a temperature of about 80° C., the sodium silicate solution was then added to the aqueous dispersion of nanocrystalline cellulose over about 80 minutes. During the addition of the sodium silicate solution, sulfuric acid was also added, so as to keep the pH at a value of about 9.3.

Once the addition of sodium silicate had ended, the reaction mixture was kept under agitation for additional 15 minutes at about 80° C. and, subsequently, the pH was brought to a value of 4 over 20 minutes by adding further sulfuric acid and while keeping the reaction mixture at about 80° C., so as to hydrolyze the sodium silicate and deposit a silica coating on the nanocrystalline cellulose, thus obtaining about 11 g of a composite reinforcing filler. The composite reinforcing filler thus obtained was then purified by means of centrifuging (2000-3000 g for 10-20 minutes), followed by washing with distilled water and lyophilization (24 hours) and subsequently characterized. Table 1 shows the characteristics of the composite reinforcing filler.

TABLE 1

|  | Composite reinforcing filler according to Example 1 | Composite reinforcing filler according to Example 2 |
| --- | --- | --- |
| Length (nm) | 110-220 | 110-220 |
| Diameter (nm) | 10-30 | 10-30 |
| % silica (by weight) | 57.02 | 56.39 |
| Density (g/cm$^3$) | 1.8 | 1.8 |
| Surface area (m$^2$/g) | 87.28 | 99.18 |
| Crystallinity degree (%) | 40% | 40% |

Example 3

Preparation of Natural Rubber Masterbatches Comprising 20 Phr, 30 Phr and 40 Phr of Composite Reinforcing Fillers According to Examples 1 and 2
Materials Composite reinforcing filler according to Example 1;
Composite reinforcing filler according to Example 2;
Natural rubber latex HA obtained by centrifuging and stabilized with ammonia (60% by weight—commercialized by Von Bundit Co. Ltd);
Acetic acid (99%—Sigma).
Procedure For the preparation of all of the masterbatches the same following procedure was followed, changing exclusively the amount of composite reinforcing filler incorporated in the masterbatch.

For the preparation of the masterbatch comprising 20 phr of composite reinforcing filler, about 6.6 grams of the latter were suspended in 250 ml of distilled water, thus forming an aqueous dispersion of the composite reinforcing filler.

The 250 ml of aqueous dispersion of the composite reinforcing filler were mixed in a container provided with a magnetic stirrer with 55 grams of natural rubber latex at 300 rpm for about 30 minutes at 25° C. Subsequently, acetic acid was added so as to bring the pH of the mixture below the value of 4 and coagulate the latex, so as to obtain a coagulated product comprising the composite reinforcing filler. The coagulated product was then purified by means of vacuum filtration, washed with distilled water to eliminate the excess acetic acid up to a pH of about 6 of the washing water and dried under vacuum at 45° C. up to constant weight.

For the preparation of the masterbatches at 30 phr and 40 phr the same procedure was followed, respectively using 9.9 and 13.2 grams of composite reinforcing filler for the preparation of the aqueous dispersion.

Example 4

Preparation of Vulcanizable Elastomeric Materials Comprising the Two Masterbatches According to Example 3 and of Two Vulcanizable Elastomeric Materials Comprising Silica (Comparison)

The masterbatches comprising the composite reinforcing fillers according to Examples 1 and 2 were used to produce vulcanizable elastomeric materials for tyre components in amounts of 20 phr and 30 phr, materials (C) and (D) and materials (E) and (F) respectively. These elastomeric materials were compared with conventional elastomeric materials comprising conventional silica, materials (A) and (B). The elastomeric materials of these examples are based on model elastomeric compositions for tyre structural elements. Therefore, the results showed by these materials are predictive of those that can be obtained in a tyre.

The following Table 2 shows the compositions in phr of the vulcanizable elastomeric materials (A), (B), (C), (D), (E) and (F).

TABLE 2

|  | (A) comparison | (B) comparison | (C) invention | (D) invention | (E) invention | (F) invention |
| --- | --- | --- | --- | --- | --- | --- |
| NR | 100 | 100 | 0 | 0 | 0 | 0 |
| Silica | 20 | 30 | 0 | 0 | 0 | 0 |

TABLE 2-continued

|  | (A) comparison | (B) comparison | (C) invention | (D) invention | (E) invention | (F) invention |
|---|---|---|---|---|---|---|
| MASTER 1 | 0 | 0 | 120 | 0 | 0 | 0 |
| MASTER 2 | 0 | 0 | 0 | 120 | 0 | 0 |
| MASTER 3 | 0 | 0 | 0 | 0 | 130 | 0 |
| MASTER 4 | 0 | 0 | 0 | 0 | 0 | 130 |
| TESPT | 2 | 2 | 2 | 2 | 2 | 2 |
| CB N234 | 2 | 2 | 2 | 2 | 2 | 2 |
| Soluble Sulfur | 2 | 2 | 2 | 2 | 2 | 2 |
| ZnO | 5 | 5 | 5 | 5 | 5 | 5 |
| Stearic Acid | 2 | 2 | 2 | 2 | 2 | 2 |
| CBS | 2 | 2 | 2 | 2 | 2 | 2 |
| TMQ | 1 | 1 | 1 | 1 | 1 | 1 |
| 6 PPD | 1.5 | 1.5 | 1.5 | 1.5 | 1.5 | 1.5 |

Materials

MASTER 1: Natural rubber masterbatch prepared according to Example 3 comprising 20 phr of composite reinforcing filler according to Example 1;

MASTER 2: Natural rubber masterbatch prepared according to Example 3 comprising 20 phr of composite reinforcing filler according to Example 2;

MASTER 3: Natural rubber masterbatch prepared according to Example 3 comprising 30 phr of composite reinforcing filler according to Example 1;

MASTER 4: Natural rubber masterbatch prepared according to Example 3 comprising 30 phr of composite reinforcing filler according to Example 2;

NR: coagulated natural rubber, obtained by coagulation of natural rubber latex HA obtained by centrifuging and stabilized with ammonia (60% by weight—commercialized by Von Bundit Co. Ltd);

Silica: Silica Ultrasil VN3, Ege Kymia;

TESPT: bis(3-triethoxysilylpropyl) tetrasulfide, Si69®;

CB: Carbon black N234, Cabot;

Soluble Sulfur: S8 (soluble sulfur), Zolfo Industria;

ZnO: Zinc Oxide, Zincol Ossidi;

Stearic acid: Stearin TP8, Undesa;

CBS: N-cyclohexyl-2-benzothiazolesulfenamide (Vulkacit CZ/C), Lanxess;

TMQ: polymerized 2,2,4-trimethyl-1,2 dihydroquinoline, Kemai;

6PPD: N-(1,3-dimethylbutyl)-N'-phenyl-p-phenylenediamine, Solutia Eastman.

Procedure

All of the components, with the exception of sulfur and the vulcanization accelerator (CBS) were mixed in an internal mixer (Brabender) for about 10 minutes (1st step).

When the temperature of 135° C. was reached, the material was mixed for another minute and then was discharged. The incomplete compound was left to rest for one day and then sulfur and the accelerator (CBS) were added and the mixing was carried out in the same mixer at about 60° C. for 9 minutes (2nd step).

Example 5

Characterization of the Vulcanizable Elastomeric Materials (A), (B), (C), (D), (E) and (F) after Vulcanization The vulcanizable elastomeric materials (A), (B), (C), (D), (E) and (F) were vulcanized at 151° C. for a time corresponding to the optimal value of the kinetic vulcanization curve, in order to measure the static mechanical and density properties thereof.

As far as the static mechanical properties are concerned, tensile tests were in particular carried out according to the standard ISO 37-2011 at 23° C., on 5 Dumbbell specimens, measuring the tensile strength (TS), the elongation at break (Eb) and the elastic modulus at elongations of 10%, 50%, 100%, 300% (M10, M50, M100 and M300 respectively) and reporting the median value.

As far as the density measurement is concerned, this was carried out on the compounds with the procedure ISO 2781, Method A, using water as reference liquid.

Furthermore, the dynamic mechanical properties and the vulcanization properties of the vulcanizable elastomeric materials (A), (B), (C), (D), (E) and (F) were evaluated using a rheometer Monsanto R.P.A. 2000 according to the following method: cylindrical test samples with weights in the range from 4.5 to 5.5 g were obtained by punching the vulcanizable elastomeric composition of samples (A), (B), (C), (D), (E) and (F). The samples were vulcanized in the instrument "RPA" at 170° C. for 10 minutes and were subjected to measurement of the dynamic elastic shear modulus with a deformation amplitude of 3% (G' (3%)) at 70° C./frequency 10 Hz, and of Tan delta with a deformation amplitude of 3% (Tan Delta (3%)) at 70° C./frequency 10 Hz. As far as the vulcanization properties are concerned, the minimum torque (ML), the maximum torque (MH), as well as the vulcanization time necessary to reach 30% and 90% of the maximum torque (T30 and T90 respectively) were measured.

The following Table 3 shows the results obtained from the characterizations carried out.

TABLE 3

|  | (A) comparison | (B) comparison | (C) invention | (D) invention | (E) invention | (F) invention |
|---|---|---|---|---|---|---|
| Density (g/cm$^3$) | 1.058 | 1.083 | 1.050 | 1.046 | 1.064 | 1.079 |
| Vulcanization time at 151° C. (minutes) | 25 | 25 | 15 | 15 | 15 | 15 |
| M10 (MPa) | 0.32 | 0.35 | 0.38 | 0.4 | 0.49 | 0.52 |
| M50 (MPa) | 0.94 | 0.94 | 1.14 | 1.23 | 1.30 | 1.55 |
| M100 (MPa) | 1.6 | 1.53 | 2.14 | 2.27 | 2.33 | 3.02 |
| M300 (MPa) | 7.77 | 7.65 | 9.98 | 9.61 | 10.6 | 13.78 |
| TS (MPa) | 20.37 | 27.21 | 25.47 | 25.48 | 26.61 | 26.04 |
| Eb (%) | 486.89 | 564.92 | 535.3 | 534.94 | 538 | 487.78 |
| ML (dNm) | 0.81 | 1.6 | 0.69 | 0.71 | 1.18 | 1.36 |
| MH (dNm) | 11.83 | 12.3 | 12.15 | 13.38 | 12.31 | 13.63 |
| T30 (minutes) | 1.65 | 2.29 | 1.31 | 1.33 | 1.09 | 1.18 |
| T90 (minutes) | 3.01 | 3.32 | 2 | 2.17 | 1.91 | 1.97 |
| G' (3%) (MPa) | 0.69 | 0.78 | 0.73 | 0.81 | 0.88 | 0.92 |
| Tan Delta (3%) | 0.064 | 0.075 | 0.089 | 0.086 | 0.107 | 0.095 |

From the analysis of the data given in Table 3 it clearly appears how the vulcanizable elastomeric materials (C) and (D) according to the present invention, whilst comprising only 20 phr of composite reinforcing filler according to the present invention, show static and dynamic mechanical properties significantly greater than those of the vulcanizable elastomeric material (A), which comprises the same amount of reinforcing filler and totally comparable to those of the vulcanizable elastomeric material (B), which on the other hand contains 30 phr of silica-based reinforcing filler, i.e. an amount greater than 50% of reinforcing filler with respect to the vulcanizable elastomeric materials (C) and (D). This shows the greater reinforcing properties of the composite reinforcing filler according to the present invention with respect to silica.

Furthermore, as far as the elastomeric materials (E) and (F) are concerned, comprising 30 phr of composite reinforcing filler, it is possible to note that by increasing the content of composite reinforcing filler it is possible to obtain values of dynamic elastic shear modulus G' and of Tan Delta, predictive of an improvement of maneuverability at high speed and in limit driving conditions, typical of high-performance tyres, for example HP and UHP tyres.

In addition, it clearly appears that the vulcanizable elastomeric materials (C) and (D) have a lower density with respect to the vulcanizable elastomeric material (A) and even more lower with respect to the vulcanizable elastomeric material (B). Therefore, the data given above highlight how the vulcanizable elastomeric materials (C) and (D) allow to produce significantly lighter elastomeric materials with the same performance.

Similarly, the vulcanizable elastomeric materials (E) and (F) show a lower density with respect to the vulcanizable elastomeric material (B), which comprises the same amount of filler, also in this case demonstrating an improved performance of the composite reinforcing filler according to the present invention with respect to conventional silica-based fillers, an improved performance which allows to produce significantly lighter elastomeric materials.

Finally, it appears how the vulcanization behavior of the vulcanizable elastomeric materials (C), (D), (E) and (F) is analogous in terms of maximum torque MH and better in terms of vulcanization kinetics with respect to the vulcanizable elastomeric materials (A) and (B).

The ML data predictive of the viscosity of the compound also indicates that this is lower for the same filler quantity.

From the data given above it therefore ensues that the vulcanizable elastomeric materials (C), (D), (E) and (F) are substantially workable with improved energy costs with respect to those of the vulcanizable elastomeric materials (A) and (B), and show significantly higher vulcanization kinetics with respect to the latter, to the benefit of the productivity of the processes in which they are used.

Example 6

Preparation of a SBR Masterbatch Comprising 20 Phr of the Composite Reinforcing Filler According to Example 2

Materials

Composite reinforcing filler according to Example 2;
SBR latex in emulsion (solid content 66% by weight, Europrene Latice E-5570, Versalis);
Acetic acid (99%—Sigma).

Procedure

For the preparation of the masterbatch the following procedure was followed.

About 6.6 grams of the composite reinforcing filler were suspended in 250 ml of distilled water, thus forming an aqueous dispersion of the composite reinforcing filler.

The 250 ml of aqueous dispersion of the composite reinforcing filler were mixed in a container provided with a magnetic stirrer with 50 grams of SBR latex at 300 rpm for about 30 minutes at 25° C. Thereafter, acetic acid was added so as to bring the pH of the mixture to a value below 4 and to coagulate the latex, so as to obtain a coagulated product comprising the composite reinforcing filler. The coagulated product was then purified by means of vacuum filtration, washed with distilled water to eliminate the excess acetic acid until a pH value of about 6 of the washing waters was obtained and dried under vacuum at 45° C. until constant weight.

Example 7

Preparation of a Vulcanizable Elastomeric Material Comprising the Masterbatch According to Example 6 and of Three Vulcanizable Elastomeric Materials Comprising Silica (Comparison)

The masterbatch according to example 6 was used to produce a vulcanizable elastomeric material for tyre components in an amount of 20 phr, material (L). This elastomeric material was compared with conventional elastomeric materials comprising 20 phr, 30 phr and 40 phr of silica, materials (G), (H) and (I) respectively. The elastomeric materials of these examples are based on model elastomeric compositions for tyre structural elements. Therefore, the results shown by these materials are predictive of those that can be obtained in a tyre.

The following Table 4 shows the compositions in phr of the materials.

TABLE 4

|  | (G) comparison | (H) comparison | (I) comparison | (L) invention |
| --- | --- | --- | --- | --- |
| E-SBR | 80 | 80 | 80 | 0 |
| NR | 20 | 20 | 20 | 20 |
| MASTER 5 | 0 | 0 | 0 | 100 |
| Silica | 20 | 30 | 40 | 0 |
| TESPT | 1.6 | 2.4 | 3.2 | 1.6 |
| CB N234 | 1.6 | 2.4 | 3.2 | 1.6 |
| Soluble Sulfur | 1.63 | 1.63 | 1.63 | 1.63 |
| ZnO | 2.5 | 2.5 | 2.5 | 2.5 |
| Stearic Acid | 2.5 | 2.5 | 2.5 | 2.5 |
| CBS | 2.9 | 2.9 | 2.9 | 2.9 |
| TMQ | 1 | 1 | 1 | 1 |
| 6PPD | 1.5 | 1.5 | 1.5 | 1.5 |

Materials

MASTER 5: SBR masterbatch comprising 20 phr of composite reinforcing filler according to Example 2;

E-SBR: coagulated SBR, obtained by coagulation from SBR latex in emulsion with styrene % of 26% (solid content 66% by weight, Europrene Latice® E-5570, Versalis);

NR: coagulated natural rubber, obtained by coagulation of natural rubber latex HA obtained by centrifuging and stabilized with ammonia (60% by weight—commercialized by Von Bundit Co. Ltd);

Silica: Silica Ultrasil VN3, Ege Kymia;
TESPT: bis(3-triethoxysilylpropyl) tetrasulfide, Si69®;
CB: Carbon black N234, Cabot;
Soluble Sulfur: S8 (soluble sulfur), Zolfo Industria;
ZnO: Zinc oxide, Zincol Ossidi;
Stearic acid: Stearin TP8, Undesa;
CBS: N-cyclohexyl-2-benzothiazolesulfenamide (Vulkacit CZ/C), Lanxess;
TMQ: polymerized 2,2,4-trimethyl-1,2 dihydroquinoline, Kemai;
6PPD: N-(1,3-dimethylbutyl)-N'-phenyl-p-phenylenediamine, Solutia Eastman.

Procedure

All the components, with the exception of the sulfur and the vulcanization accelerator (CBS) were mixed in an internal mixer (Brabender) for about 10 minutes (1st step).

When the temperature of 135° C. was reached, the material was mixed for another minute and then was discharged. The incomplete compound was left to rest for a day. The sulfur and the accelerator (CBS) were then added and the mixing was carried out in the same mixer at about 60° C. for 9 minutes (2nd step).

Example 8

Characterization of the Vulcanizable Elastomeric Materials (G), (H), (I) and (L) after Vulcanization The vulcanizable elastomeric materials (G), (H), (I) and (L) were subjected to characterization tests as shown in the previous Example 5.

The following Table 5 shows the results obtained by the characterizations carried out.

TABLE 5

|  | (G) comparison | (H) comparison | (I) comparison | (L) invention |
|---|---|---|---|---|
| Density (g/cm³) | 1.05 | 1.104 | 1.138 | 1.045 |
| M10 (MPa) | 0.43 | 0.53 | 0.7 | 0.61 |
| M50 (MPa) | 1.52 | 1.59 | 2.12 | 1.88 |
| M100 (MPa) | 3.19 | 3.14 | 4.45 | 3.67 |
| TS (MPa) | 11.02 | 13.25 | 16.93 | 13.30 |
| Eb (%) | 244.34 | 293.27 | 268.06 | 315.79 |
| ML (dNm) | 1.59 | 2.89 | 3.48 | 3.15 |
| MH (dNm) | 12.56 | 16.35 | 18.94 | 16.99 |
| T30 (minutes) | 1.47 | 2.25 | 2 | 1.83 |
| T90 (minutes) | 2.83 | 4.37 | 3.92 | 3.71 |
| G' (3%) (MPa) | 1.05 | 1.36 | — | 1.62 |
| Tan Delta (3%) | 0.106 | 0.102 | 0.187 | 0.138 |

Similarly to what was observed from the data given in Table 3, it also clearly appears from the data reported in Table 5 how the vulcanizable elastomeric material (L) according to the present invention, whilst comprising only 20 phr of composite reinforcing filler according to the present invention, shows significantly greater static and dynamic mechanical properties than those of the vulcanizable elastomeric material (G), which comprises the same amount of reinforcing filler and intermediate between those of the vulcanizable elastomeric material (H), which contains 30 phr of silica-based reinforcing filler, and of the vulcanizable elastomeric material (I), which contains 40 phr of silica-based reinforcing filler. This shows the greater reinforcing properties of the composite reinforcing filler according to the present invention with respect to silica.

In addition, it clearly appears that the vulcanizable elastomeric material (L) has a lower density with respect to the vulcanizable elastomeric material (G) and even more lower with respect to the vulcanizable elastomeric materials (H) and (I). Therefore, the data given above highlight how the vulcanizable elastomeric material (L) allows to produce significantly lighter elastomeric materials with the same performance.

Finally, it appears how the vulcanization behavior of the vulcanizable elastomeric material (L) is analogous in terms of torque and is better in terms of vulcanization kinetics with respect to the materials having equal performance (H) and (I). From the data reported above, therefore, it appears that the vulcanizable elastomeric material (L) is substantially workable with energy costs analogous to those of the vulcanizable elastomeric materials (H) and (I), but shows significantly higher vulcanization kinetics with respect to the latter, to the benefit of the productivity of the processes in which they are used.

Example 9

Preparation of Vulcanizable Elastomeric Materials Comprising the Natural Rubber Masterbatches According to Example 3 and of Three Vulcanizable Elastomeric Materials Comprising Silica (Comparison)

Three natural rubber masterbatches respectively comprising 20 phr, 30 phr and 40 phr of composite reinforcing filler according to Example 2 were used to produce vulcanizable elastomeric materials for tyre components, (P), (Q) and (R) respectively. These elastomeric materials were compared with conventional elastomeric materials comprising conventional silica, materials (M), (N) and (O). The elastomeric materials of these examples are based on model elastomeric compositions for tyre structural elements. Therefore, the results shown by these materials are predictive of those that can be obtained in a tyre.

The following Table 6 shows the compositions in phr of the vulcanizable elastomeric materials (M), (N), (O), (P), (Q) and (R).

TABLE 6

|  | (M) comparison | (N) comparison | (O) comparison | (P) invention | (Q) invention | (R) invention |
|---|---|---|---|---|---|---|
| NR | 100 | 100 | 100 | 0 | 0 | 0 |
| Silica | 20 | 30 | 40 | 0 | 0 | 0 |
| MASTER 2 | 0 | 0 | 0 | 120 | 0 | 0 |
| MASTER 4 | 0 | 0 | 0 | 0 | 130 | 0 |
| MASTER 6 | 0 | 0 | 0 | 0 | 0 | 140 |
| TESPT | 2 | 2.4 | 3.2 | 2 | 2.4 | 3.2 |
| CB | 2 | 2.4 | 3.2 | 2 | 2.4 | 3.2 |
| Soluble Sulfur | 2 | 2 | 2 | 2 | 2 | 2 |
| ZnO | 5 | 5 | 5 | 5 | 5 | 5 |
| Stearic Acid | 2 | 2 | 2 | 2 | 2 | 2 |
| CBS | 2 | 2 | 2 | 2 | 2 | 2 |
| TMQ | 1 | 1 | 1 | 1 | 1 | 1 |
| 6 PPD | 1.5 | 1.5 | 1.5 | 1.5 | 1.5 | 1.5 |

Materials

MASTER 2: Natural rubber masterbatch prepared according to Example 3 comprising 20 phr of composite reinforcing filler according to Example 2;

MASTER 4: Natural rubber masterbatch prepared according to Example 3 comprising 30 phr of composite reinforcing filler according to Example 2;

MASTER 6: Natural rubber masterbatch prepared according to Example 3 comprising 40 phr of composite reinforcing filler according to Example 2;

NR: coagulated natural rubber, obtained by coagulation of natural rubber latex HA obtained by centrifuging and stabilized with ammonia (60% by weight commercialized by Von Bundit Co. Ltd);

Silica: Silica Ultrasil VN3, Ege Kymia;

TESPT: bis(3-triethoxysilylpropyl) tetrasulfide, Si69®;

CB: Carbon black N234, Cabot;

Soluble Sulfur: S8 (soluble sulfur), Sulfur Industria;

ZnO: Zinc oxide, Zincol Ossidi;

Stearic acid: Stearin TP8, Undesa;

CBS: N-cyclohexyl-2-benzothiazolesulfenamide (Vulkacit CZ/C), Lanxess;
TMQ: polymerized 2,2,4-trimethyl-1,2 dihydroquinoline, Kemai;
6PPD: N-(1,3-dimethylbutyl)-N'-phenyl-p-phenylenediamine, Solutia Eastman.

Procedure

All the components, with the exception of the sulfur and the vulcanization accelerator (CBS) were mixed in an internal mixer (Brabender) for about 10 minutes in total (1st step).

At the end of the 9 minutes when the temperature of 135° C. was reached, the material was mixed for another minute and then was discharged. The incomplete compound was left to rest for one day. The sulfur and the accelerator (CBS) were then added and the mixing was carried out in the same mixer at about 60° C. for 9 minutes (2nd step).

Example 10

Characterization of the Vulcanizable Elastomeric Materials (M), (N), (O), (P), (Q) and (R) after Vulcanization The vulcanizable elastomeric materials (M), (N), (O), (P), (Q) and (R) were subjected to characterization tests as shown in the previous Example 5.

The following Table 7 show the results obtained by the characterizations carried out.

TABLE 7

|  | (M) comparison | (N) comparison | (O) comparison | (P) invention | (Q) invention | (R) invention |
|---|---|---|---|---|---|---|
| Density (g/cm³) | 1.054 | 1.097 | 1.131 | 1.046 | 1.066 | 1.095 |
| M10 (MPa) | 0.32 | 0.38 | 0.41 | 0.38 | 0.5 | 0.61 |
| M50 (MPa) | 0.94 | 1.02 | 1.09 | 1.14 | 1.38 | 1.64 |
| M100 (MPa) | 1.6 | 1.71 | 1.84 | 2.14 | 2.51 | 2.94 |
| M300 (MPa) | 7.77 | 9.15 | 10.08 | 9.98 | 10.94 | 12.04 |
| TS (MPa) | 20.37 | 28.92 | 27.96 | 25.47 | 27.09 | 28.41 |
| Eb (%) | 486.89 | 549.21 | 562 | 535.3 | 523.9 | 543.46 |
| ML (dNm) | 0.81 | 1.32 | 1.98 | 0.69 | 0.88 | 2.09 |
| MH (dNm) | 11.83 | 13.6 | 16.09 | 12.15 | 14.17 | 19.14 |
| T90 (minutes) | 3.01 | 3.41 | 3.42 | 2 | 2.43 | 2.72 |
| G' (3%) (MPa) | 0.69 | 0.9 | 1.17 | 0.73 | 0.95 | 1.6 |
| Tan Delta (3%) | 0.064 | 0.06 | 0.097 | 0.089 | 0.091 | 0.119 |

From the data reported in Table 7 it is possible to further confirm what emerged from the previous Examples, i.e. that the composite reinforcing filler according to the present invention has greater reinforcing properties than those of silica-based reinforcing fillers, allowing to use smaller amounts of filler to achieve the same performance.

Furthermore, also from the data of Table 7 it appears that by using higher amounts of composite reinforcing filler according to the present invention, for example 30 or 40 phr, it is possible to obtain values of dynamic shear elastic modulus G' and of Tan Delta, predictive of an improvement of maneuverability at high speed and in limit driving conditions, typical of high-performance tyres, for example HP and UHP tyres.

In addition, it ensues that the vulcanizable elastomeric materials (P) (Q) and (R) always show lower density values, for the same amount of filler, with respect to vulcanizable elastomeric materials containing silica-based reinforcing fillers, materials (M), (N) and (O) respectively, thus allowing to produce significantly lighter elastomeric materials.

Finally, it appears how the vulcanization behavior of the vulcanizable elastomeric materials (P) (Q) and (R) is analogous in terms of torque and better in terms of vulcanization kinetics with respect to materials (M), (N) and (O).

From the data given above it therefore ensues that the vulcanizable elastomeric materials (P) (Q) and (R) are substantially workable with energy costs analogous to those of the vulcanizable elastomeric materials (M), (N) and (O), but show significantly higher vulcanization kinetics with respect to the latter, to the benefit of the productivity of the processes in which they are used.

The above examples should not be considered exhaustive of the advantages of the invention, for which reason the carbon black could also be replaced with advantages by a renewable composite reinforcing filler according to the invention. In this regard, the Applicant deems that the composite reinforcing filler can prove more reinforcing with respect to carbon black due to its fibrous rather than spherical particle nature.

The invention claimed is:

1. A tyre for vehicle wheels comprising at least one structural element comprising a vulcanized elastomeric material obtained by vulcanizing a vulcanizable elastomeric composition comprising:
    (a) at least one vulcanizable diene elastomeric polymer; and
    (b) at least one composite reinforcing filler comprising a core, and the core comprises nanocrystalline cellulose and an at least partial coating comprising silica.

2. The tyre according to claim 1, wherein the composite reinforcing filler has a core-shell structure, and the core-shell structure comprises a core comprising nanocrystalline cellulose and a shell comprising silica.

3. The tyre according to claim 1, wherein the composite reinforcing filler has a diameter ranging from 10 nm to 60 nm and a length ranging from 100 nm to 1000 nm.

4. The tyre according to claim 1, wherein the composite reinforcing filler has a degree of crystallinity ranging from 10% to 80%.

5. The tyre according to claim 1, wherein the composite reinforcing filler has a density ranging from 1.5 g/cm³ to 1.9 g/cm³.

6. The tyre according to claim 1, wherein the composite reinforcing filler has a BET total surface area ranging from 20 m²/g to 400 m²/g.

7. The tyre according to claim 1, wherein the composite reinforcing filler comprises from 20% to 80% by weight of silica with respect to the total weight of the composite reinforcing filler.

8. The tyre according to claim 1, wherein the vulcanizable elastomeric composition comprises from 0.1 phr to 40 phr of the composite reinforcing filler per 100 phr of vulcanizable diene elastomeric polymer.

9. The tyre according to claim 1, wherein the structural element is chosen from a tread band, a carcass structure, a belt structure, an underlayer, an anti-abrasive strip, a sidewall, a sidewall insert, a mini-sidewall, a flipper, a chafer, an underliner, rubber layers, a bead filling, and rubber sheets.

10. A process for producing a tyre for vehicle wheels, comprising:

providing a vulcanizable elastomeric composition comprising:
(a) at least one vulcanizable diene elastomeric polymer; and
(b) at least one composite reinforcing filler comprising a core, and the core comprises nanocrystalline cellulose and an at least partial coating comprising silica;
providing a tyre structural element comprising the vulcanizable elastomeric composition;
assembling the tyre structural element in a green tyre; and
vulcanizing the green tyre.

11. The process according to claim 10, wherein providing a vulcanizable elastomeric composition comprises:
feeding to at least one mixing apparatus comprising at least one discontinuous mixer and at least one continuous mixer, or at least one discontinuous mixer or at least one continuous mixer:the at least one vulcanizable diene elastomeric polymer, and the at least one composite reinforcing filler;
mixing and dispersing to obtain the vulcanizable elastomeric composition; and
discharging the vulcanizable elastomeric composition from the at least one mixing apparatus.

12. The process according to claim 11, wherein the composite reinforcing filler is fed to the at least one mixing apparatus in the form of a masterbatch and the masterbatch comprises:
at least one vulcanizable diene elastomeric polymer; and the composite reinforcing filler.

13. A masterbatch comprising:
(a) at least one vulcanizable diene elastomeric polymer; and
(b) at least one composite reinforcing filler comprising a core and the core comprises nanocrystalline cellulose and an at least partial coating comprising silica.

14. The masterbatch according to claim 13, wherein the composite reinforcing filler has a core-shell structure, and the core-shell structure comprises a core comprising nanocrystalline cellulose and a shell comprising silica..

15. The masterbatch according to claim 13, wherein the composite reinforcing filler is present in an amount from 5 phr to 120 phr per 100 phr of the vulcanizable diene elastomeric polymer.

16. A process for producing a masterbatch comprising:
(a) at least one vulcanizable diene elastomeric polymer; and
(b) at least one composite reinforcing filler comprising a core and the core comprises nanocrystalline cellulose and an at least partial coating comprising silica;
wherein the process comprises:
I. providing an aqueous dispersion of the composite reinforcing filler;
II. adding, by mixing, the aqueous dispersion of step I. to a latex and the latex comprises the vulcanizable diene elastomeric polymer;
III. coagulating the latex resulting from step II. to obtain a coagulated product comprising the composite reinforcing filler; and
IV. purifying the coagulated product resulting from step III.

17. The process according to claim 16, wherein purifying the coagulated product comprises at least one operation chosen from filtering, washing, centrifuging, drying, and lyophilizing.

18. A process for producing a composite reinforcing filler comprising:

(A). dispersing a nanocrystalline cellulose at a temperature ranging from 70° C. to 90° C. in an aqueous dispersing medium in the presence of at least one surfactant chosen from cationic surfactants and amphoteric surfactants to obtain an aqueous dispersion comprising nanocrystalline cellulose;
(B). adding at least one silica precursor compound to the aqueous dispersion resulting from step (A);
(C). depositing an at least partial coating of silica on the nanocrystalline cellulose by hydrolyzing the silica precursor compound to obtain a composite reinforcing filler comprising a core and the core comprises nanocrystalline cellulose and an at least partial coating comprising silica; and
(D). purifying the composite reinforcing filler resulting from step (C).

19. The process according to claim 18, wherein the surfactant is chosen from benzalkonium chloride, cetrimonium chloride, hexadecyltrimethylammonium bromide, undecyl amido propyl trimethylammonium metasulphate, and coco alkyl trimethylammonium metasulphate.

20. The process according to claim 18, wherein the surfactant is added in an amount ranging from 10% to 20%, by weight with respect to the weight of the nanocrystalline cellulose.

21. The process according to claim 18, wherein the silica precursor compound is chosen from:
I. alkaline silicates of the formula:

$$M_2O \cdot n(SiO_2) \tag{I}$$

wherein M is chosen from Na, K, and Li and wherein n is ranging from 0.5 to 4, II. tetra-alkyl derivatives of silicic acid of the formula $$(RO)_4Si \tag{II}$$

wherein the R groups are the same or different from each other and represent $C_1$-$C_6$ alkyls, and
III. halosilanes of the formula $$SiX_4, (RO)_3SiX, (RO)_2SiX_2, \text{ or } (RO)SiX_3 \tag{III}$$

wherein the R groups are the same or different from each other and are chosen from $C_1$-$C_6$ alkyls, and X are the same or different from each other and are chosen from chlorine, bromine, and iodine.

22. The process according to claim 21, wherein the silica precursor compound is an alkaline silicate.

23. The process according to claim 22, wherein in step (B) the addition is carried out while keeping the aqueous dispersion in a basic medium and at a temperature ranging from 70° C. to 90° C.

24. The process according to claim 22, wherein the amount of alkaline silicate ranges from 50% to 150%, by weight with respect to the weight of the nanocrystalline cellulose.

25. The process according to claim 22, wherein step (B) further comprises adding at least one acid chosen from hydrochloric acid, phosphoric acid, nitric acid, sulphuric acid, acetic acid, and carbonic acid.

26. The process according to claim 22, wherein step (B) comprises:
(B1) adding at least one first portion of alkaline silicate to the aqueous dispersion resulting from step (A), while keeping the aqueous dispersion at a pH ranging from 8.5 to 9.5;
(B2) stirring the aqueous dispersion resulting from step (B1) for a time ranging from 80 minutes to 100 minutes; and (B3) adding at least one second portion of alkaline silicate to the aqueous dispersion resulting from step (B2), while keeping the aqueous dispersion at a pH ranging from 7 to 8.

27. The process according to claim 22, wherein step (C) of depositing an at least partial coating of silica on the nanocrystalline cellulose comprises hydrolyzing the alkaline silicate in the aqueous dispersion resulting from step (B) in an acidic medium to hydrolyze the alkaline silicate (I) and obtaining a composite reinforcing filler that comprises a core comprising nanocrystalline cellulose and an at least partial coating comprising silica.

28. The process according to claim 22, wherein step (C) comprises adding at least one acid chosen from hydrochloric acid, phosphoric acid, nitric acid, sulphuric acid, acetic acid, and carbonic acid.

29. The process according to claim 18, wherein purifying the composite reinforcing filler comprises at least one operation chosen from filtering, washing, centrifuging, drying, lyophilizing, and any combination thereof.

30. The process according to claim 18, wherein the composite reinforcing filler resulting from step (C) has a core-shell structure, and the core-shell structure comprises a core comprising nanocrystalline cellulose and a shell comprising silica.

* * * * *